(12) United States Patent
Dalton et al.

(10) Patent No.: US 11,605,384 B1
(45) Date of Patent: Mar. 14, 2023

(54) DUPLEX COMMUNICATIONS FOR CONVERSATIONAL AI BY DYNAMICALLY RESPONSIVE INTERRUPTING CONTENT

(71) Applicant: NVIDIA Corporation, Santa Clara, CA (US)

(72) Inventors: Steven Dalton, Cary, NC (US); Siddha Ganju, Santa Clara, CA (US); Ruthie Lyle, Durham, NC (US)

(73) Assignee: NVIDIA Corporation, Santa Clara, CA (US)

( * ) Notice: Subject to any disclaimer, the term of this patent is extended or adjusted under 35 U.S.C. 154(b) by 45 days.

(21) Appl. No.: 17/390,118

(22) Filed: Jul. 30, 2021

(51) Int. Cl.
*G10L 15/22* (2006.01)
*G10L 15/08* (2006.01)

(52) U.S. Cl.
CPC ............ *G10L 15/222* (2013.01); *G10L 15/08* (2013.01); *G10L 2015/225* (2013.01)

(58) Field of Classification Search
CPC .. G10L 15/222; G10L 15/08; G10L 2015/225
USPC ........................................................ 704/275
See application file for complete search history.

(56) References Cited

U.S. PATENT DOCUMENTS

| | | | |
|---|---|---|---|
| 7,620,549 B2 * | 11/2009 | Di Cristo | G10L 15/1815 704/251 |
| 10,043,516 B2 * | 8/2018 | Saddler | G06F 3/165 |
| 10,051,442 B2 | 8/2018 | Proctor | |
| 10,229,673 B2 | 3/2019 | Kennewick, Jr. et al. | |
| 10,431,235 B2 * | 10/2019 | Levien | G10L 21/00 |
| 10,553,209 B2 * | 2/2020 | Gruber | G10L 15/22 |
| 10,705,794 B2 * | 7/2020 | Gruber | G10L 15/22 |
| 10,739,951 B2 * | 8/2020 | Rosenberg | G06F 3/013 |

(Continued)

FOREIGN PATENT DOCUMENTS

| | | |
|---|---|---|
| CN | 111508474 B | 4/2021 |
| WO | 2016127550 A1 | 8/2016 |

OTHER PUBLICATIONS

Vajjala, S.; "Machine Learning in Applied Linguistics," In The Encyclopedia of Applied Linguistics; https://doi.org/10.1002/9781405198431.wbeal1486; Jun. 7, 2018; 9 pages.

(Continued)

*Primary Examiner* — Susan I McFadden
(74) *Attorney, Agent, or Firm* — Plumsea Law Group, LLC

(57) ABSTRACT

Systems and methods of presenting interrupting content during human speech are disclosed. The proposed systems offer improved duplex communications in conversational AI platforms. In some embodiments, the system receives speech data and evaluates the data using linguistic models. If the linguistic models detect indications of linguistic irregularities such as mispronunciation, a smart feedback assistant can determine that the system should interrupt the speaker in near-real-time and provide feedback regarding their pronunciation. In addition, conversational irregularities may also be detected, causing the smart feedback assistant to interrupt with presentation of moderating guidance. In some cases, emotion models may also be utilized to detect emotional states based on the speaker's voice in order to offer near-immediate feedback. Users can also customize the manner and occasions in which they are interrupted.

20 Claims, 18 Drawing Sheets

(56) References Cited

U.S. PATENT DOCUMENTS 10,847,155 B2    11/2020  Zhou

OTHER PUBLICATIONS

Ramos, V.M. et al.; "Acoustic features to characterize sentence accent production in dysarthric speech," Biomedical Signal Processing and Control, vol. 57; 2020; ISSN 1746-8094; https://doi.org/10.1016/j.bspc.2019.101750; Nov. 22, 2019; 8 pages.
Mansilla, V. B. et al.; "Shared Cognitive-Emotional-Interactional Platforms: Markers and Conditions for Successful Interdisciplinary Collaborations," Science, Technology, & Human Values, 2016, 41(4), 571-612; https://doi.org/10.1177/0162243915614103; Nov. 18, 2015; 42 pages.
Ito, K. et al.; "The LJ Speech Dataset," available at: https://keithito.com/LJ-Speech-Dataset/; 2017; PDF of website, 5 pages.
Kuchaiev, O. et al.; "Nemo: a toolkit for building ai applications using neural modules," available at: https://github.com/nvidia/NeMo; Journal: arXiv preprint arXiv:1909.09577; 2019; PDF of GitHub repository, 8 pages.

\* cited by examiner

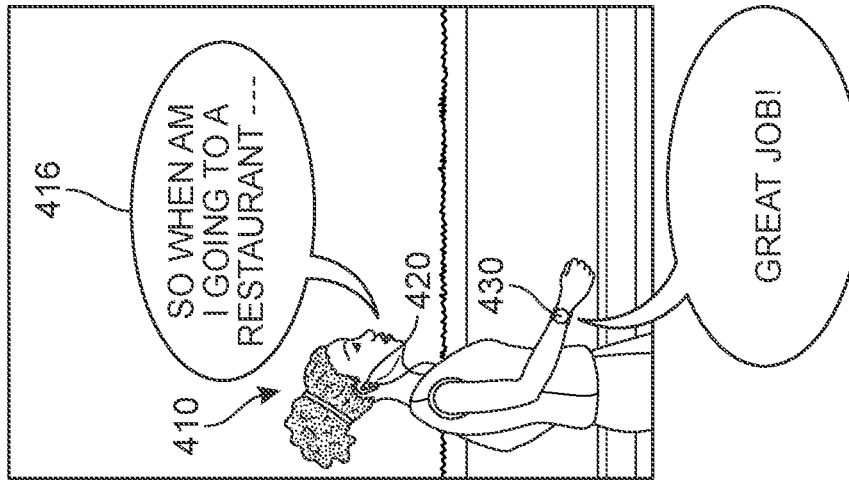
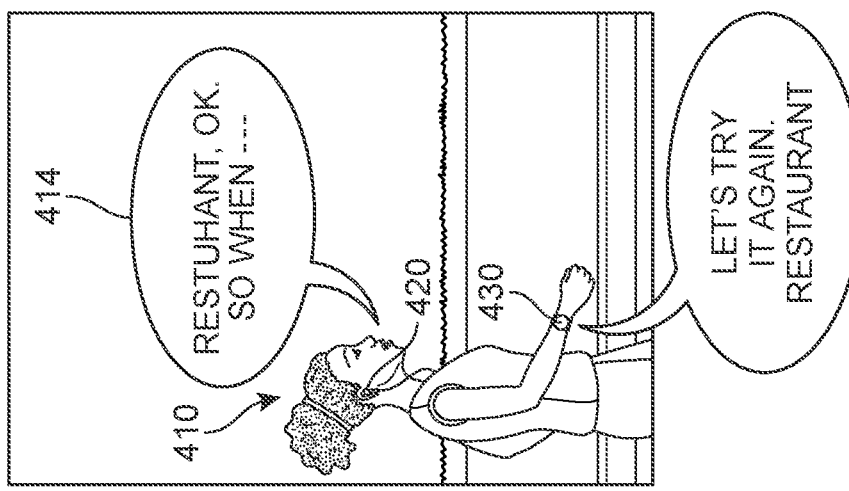
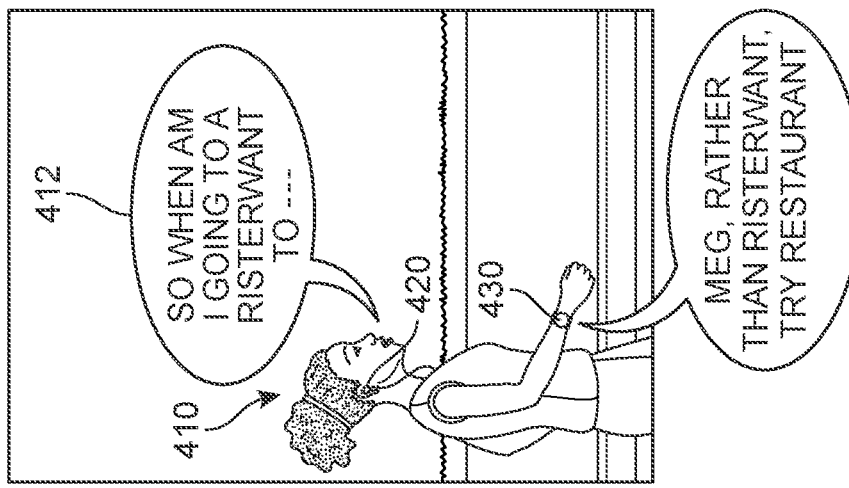

DUPLEX COMMUNICATIONS FOR CONVERSATIONAL AI BY DYNAMICALLY RESPONSIVE INTERRUPTING CONTENT

TECHNICAL FIELD

The present disclosure generally relates to automated systems and methods for presenting feedback on auditory inputs provided by users using artificial intelligence engines, and in particular to systems and methods configured to intelligently interrupt users during voice-based interactions in real-time in order to ensure timely feedback and/or moderating guidance.

BACKGROUND

The field of computer-assisted language learning has developed rapidly in recent decades, and interest specifically in computer-assisted pronunciation training has grown similarly, with a recent proliferation of web-based and mobile apps and resources. Some of these are becoming increasingly technologically sophisticated, in some cases incorporating technologies such as automated speech recognition (ASR) and artificial intelligence (AI), further enabling opportunities for language production and individualized feedback. Current artificial intelligence services are able to produce dialogue but the artificial tone associated with this dialogue has persisted. For example, there remains a gulf between the experience of a student or other user with an in-person teacher or otherwise 'real' reviewer and those who utilize such technologies. For example, AI continues to provide dialogue experiences that feel manufactured or unnatural with respect to how normal human conversations occur. In order to move closer towards the goal of integrating technology in relation to pronunciation teaching and learning, virtual feedback platforms must offer a more realistic and natural conversational experience. Furthermore, there are many other contexts in which the presentation of interrupting content by an artificial intelligence can improve conversations between two or more persons.

There is a need in the art for a system and method that addresses the shortcomings discussed above.

SUMMARY

In one aspect, a computer-implemented method of presenting interrupting content during speech is disclosed. The method includes a first step of receiving, at a first time and by an application accessed via a computing device, first audio data of a first user speaking, and a second step of detecting, via the application, at least a first indicator of a first type of speech irregularity in the first audio data. A third step includes determining, via the application and based on the first indicator, that a triggering event has occurred. The method further includes a fourth step of causing, via the application, first interrupting content to be presented, where the first interrupting content includes feedback about the detected speech irregularity, and is presented at a subsequent second time regardless of whether the first user is still speaking.

In another aspect, a computer-implemented method of presenting interrupting content during a conversation including at least a first participant and a second participant is disclosed. The method includes a first step of receiving at a first time and by an application accessed via a computing device, first audio data of at least the first participant speaking, and a second step of detecting, by the application, a first indicator of a first type of conversational irregularity in the first audio data. The method also includes a third step of determining, by the application and based on the first indicator, that a triggering event has occurred, and a fourth step of causing, via the application, first interrupting content to be presented. In addition, the first interrupting content includes moderating guidance associated with the detected conversational irregularity, and is presented at a second time while one or both of the first participant and second participant are speaking.

In another aspect, a computer-implemented method of determining whether a speech irregularity has occurred is disclosed. The method includes a first step of receiving, at a first time and by an application accessed via a computing device, first audio data of a first user speaking, and a second step of classifying, via a speech-based machine learning model for the application, one or more speech characteristics associated with the first user based on the first audio data. In addition, a third step includes receiving, at a second time and by the application, second audio data of the first user speaking, and a fourth step of determining, via the application, that a speech irregularity has occurred in the second audio data, the determination based at least in part by a comparison of the second audio data with the classified speech characteristics. Furthermore, the method includes a fifth step of causing, via the application, first interrupting content to be presented by the computing device in response to the determination that a speech irregularity has occurred. In such cases, the first interrupting content includes feedback about the detected speech irregularity, and is presented at a subsequent third time regardless of whether the first user is still speaking.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

FIGS. 4A-4E provide a sequence of an example illustrating a second user engaging the services of a smart feedback assistant, according to an embodiment;

DESCRIPTION OF THE EMBODIMENTS

Figure 1A:
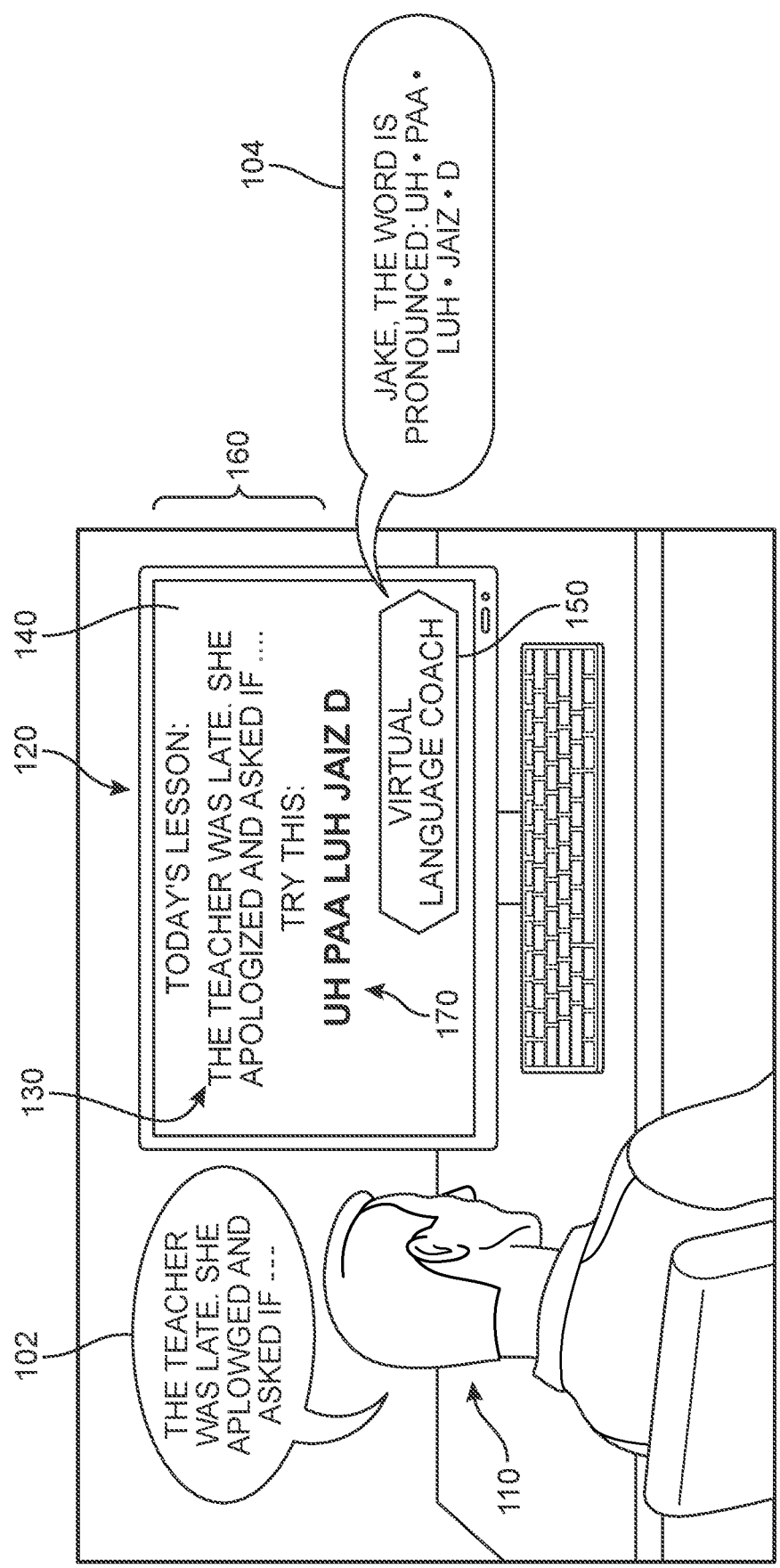
FIGS. 1A and 1B provide a sequence illustrating an example of a first user engaging the services of a smart feedback assistant, according to an embodiment.

The embodiments provide a system and method for generating and presenting appropriate responses or information during voice-based interactions with a smart feedback assistant ("assistant"). The responses are provided as real-time interruptions of dialogue by human users. In other words, rather than delaying presentation of the information until the user has completed their spoken utterance, the assistant can interrupt the ongoing user speech and offer feedback 'in the moment'. Such timely responsiveness enables the assistant to better simulate a human listener, and significantly improves the ability of the user to incorporate the feedback into their dialogue. In some cases, the assistant can be additionally or alternatively configured to intercede at appropriate times during conversations between two or more persons in order to offer moderating guidance and/or other timely feedback, thereby enriching the quality of the dialogue between the human participants.

As will be discussed in greater detail below, the proposed embodiments describe a computer-implemented service that is configured to actively listen to a user's speech content and determine when an interruption is warranted based on default settings and/or user preferences. As used herein, the term "speech content" or more simply "speech" refers to audible sounds spoken or otherwise produced by human users. In addition, a portion of a word or word that is produced by a human being that includes or is larger than a single consonant will be referred to as an utterance or "phone segment". In general, a user's speech is received as audio data by the service, which in turn determines whether or not the audio data includes an indication of a triggering event. For purposes of this application, a triggering event refers to an audible event or sequence of audible events that matches a pre-determined condition and will cause the system to generate and present an appropriate message, regardless of whether the user is still speaking. If there is an indication of a triggering event, the system initiates a processing operation to confirm the triggering event and determine the type of triggering event that has occurred.

Upon confirmation, the service can identify the appropriate response to the event type and the content of the event and present the response in near-real time, and during the user's speech.

In addition, embodiments may make use of features and components of available intelligent automated assistants, also referred to herein as a virtual assistant, that can provide an improved interface between a human and computer. Such an assistant allows users to interact with a device or system using natural language, in spoken and/or text forms. For example, a virtual assistant can be configured as an easy-to-use interface that receives and interprets user inputs, operationalizes the user's intent into tasks and parameters to those tasks, executes services to support those tasks, and produces output that is intelligible to the user.

Figure 1B:
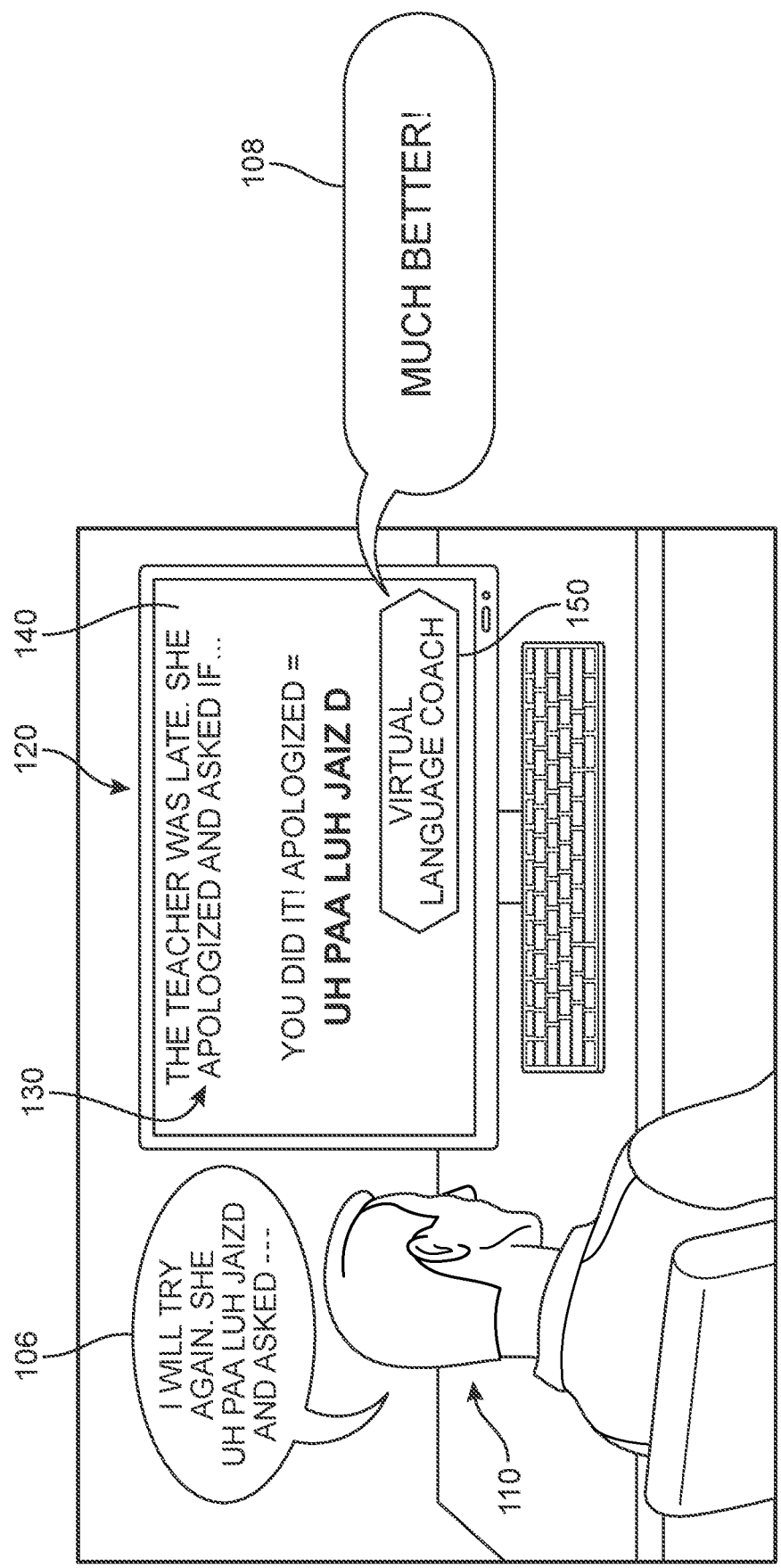

For purposes of introduction, an overview of one embodiment of the proposed systems and methods is illustrated with reference to FIGS. 1A and 1B. In FIGS. 1A and 1B, an embodiment of a smart feedback assistant system ("system") implemented via a computing device is depicted. In FIG. 1A, a first user 110 is seated at a desk engaged in an activity being provided by a first user device 120. In this case, the activity is being performed via a virtual language coaching app ("first app") 130 that is displayed on a monitor 140 of first user device 120. For example, first app 130 is displaying a text sample 160 to the first user 110, and a virtual language coach 150 access via the first app 130 is actively listening as the first user 110 attempts to recite the words shown in the text sample 160 (e.g., "The teacher was late. She apologized and asked if . . . "). As first user 110 begins speaking, the coach 150 receives the speech as audio data via a microphone connected to the first user device 120 and continuously processes and analyzes the audio data in near-real-time. In FIG. 1A, a first speech 102 by the first user 110 includes "The teacher was late. She aplowged and asked if ---". It should be understood here and throughout this disclosure that the use of dashed lines such as "---" represent instances in which someone is speaking and has been interrupted by another source (e.g., the coach 150).

As audio data including the mispronunciation of apologized as "aplowged" is received by the system, the system can detect the mispronunciation and identify what the correct or otherwise appropriate expression should have been. In response, the system immediately causes the coach 150 to interrupt the first user 110 mid-speech in order to correct him. In other words, rather than wait for the first user 110 to finish speaking, the system is configured to 'jump in' and interrupt in order to provide near-immediate feedback (i.e., as close as possible in time to the detected mispronunciation event). As shown in FIG. 1A, the first app 130, as coach 150, generates a first auditory feedback response 104 "The word is pronounced: uh•paa•luh•jaizd". In some embodiments, the first app 130 can additionally or alternatively generate a less intrusive message 170 ("Try this: uh•paa•luh•jaizd") via display 140.

In FIG. 1B, the first user 110, having received the feedback, begins again with a second speech 106 ("I will try again. She uh paa luh jaizd and asked -"). The system can be further configured in some cases to permit the user to include such conversational responses (e.g., "I will try again") and recognize that these statements, while not associated with the displayed recitation content, do not require correction. Furthermore, in some embodiments, the system can optionally intercede, per the user's selected preferences, to provide in-the-flow encouragement. In this case, the system again causes the coach 150 to interrupt the first user 110, this time with a second auditory feedback response 108 ("Much better!"), while the displayed feedback includes "You did it!". Thus, similar to the natural give-and-take conversational flow that might occur between the first user 110 and a human teacher, the system can 'talk over' or otherwise produce responses that overlap or are part of a duplex communication exchange. This type of back-and-forth exchange has been shown to offer significantly greater benefits with respect to learning a new language or other subject matter compared to feedback that is provided at the conclusion of a recitation or other speech.

Figure 2A:
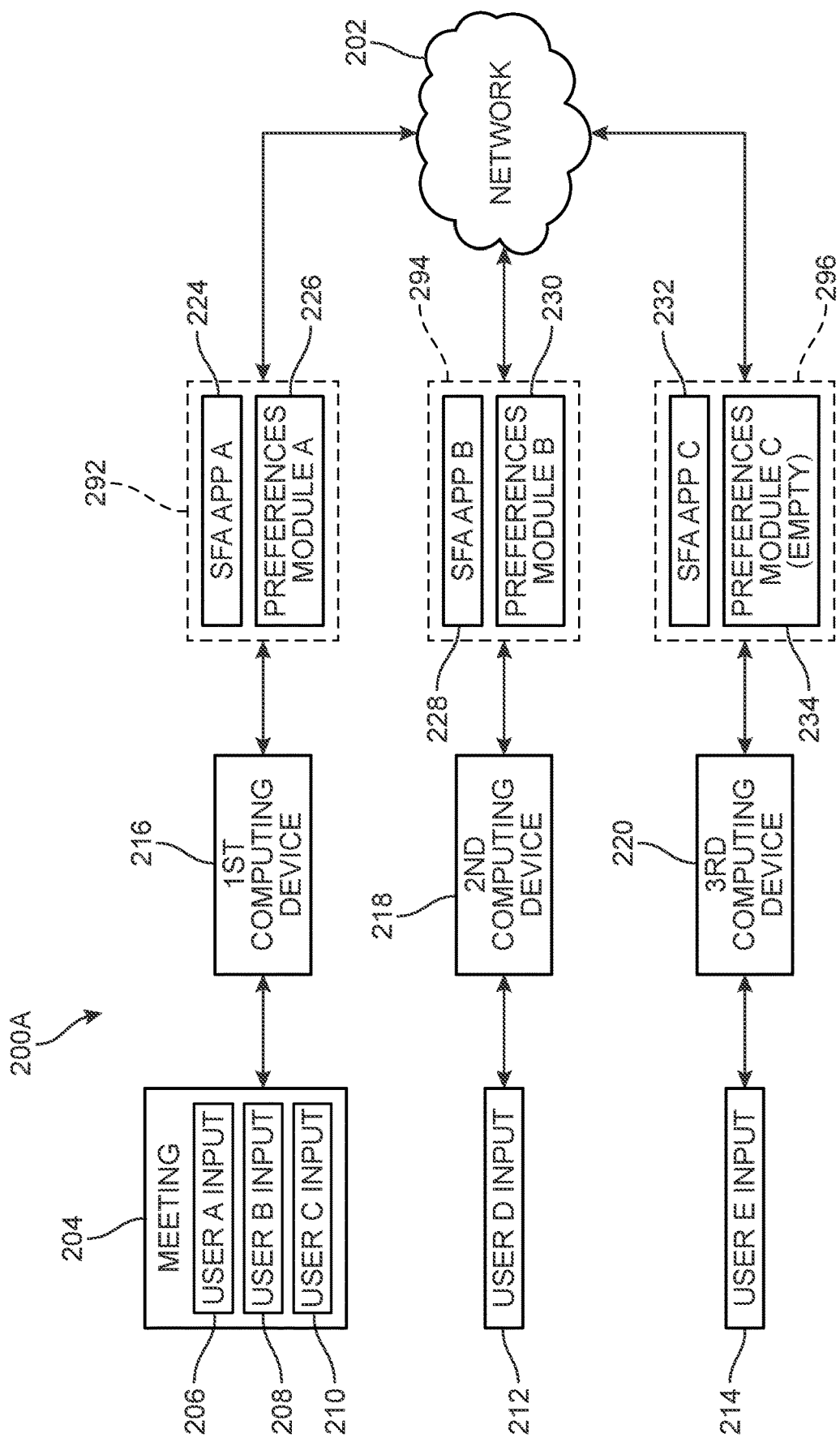
FIGS. 2A-2C collectively depict a schematic diagram of a system for providing real-time feedback to users, according to an embodiment.
Figure 2B:
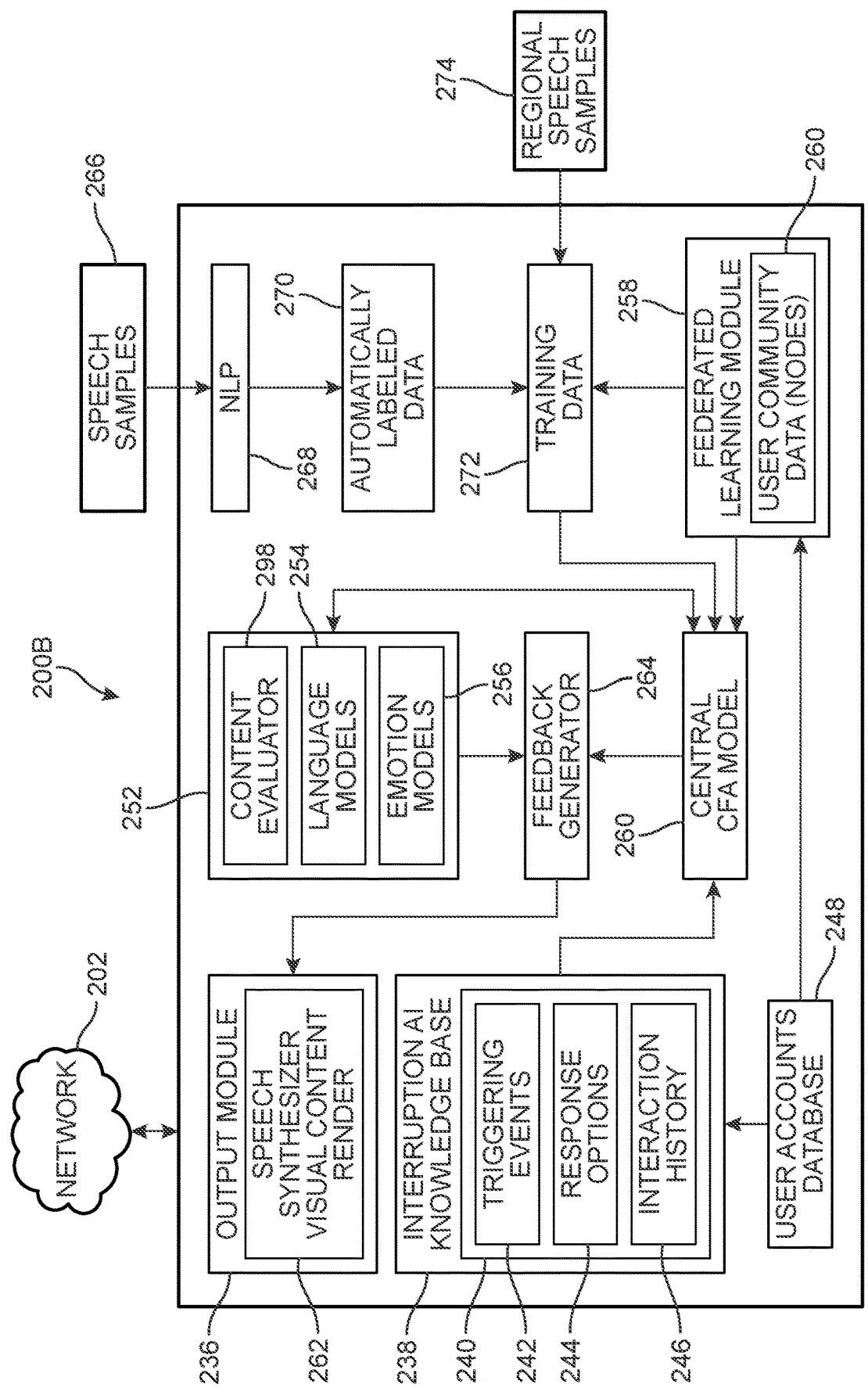
Figure 2C:
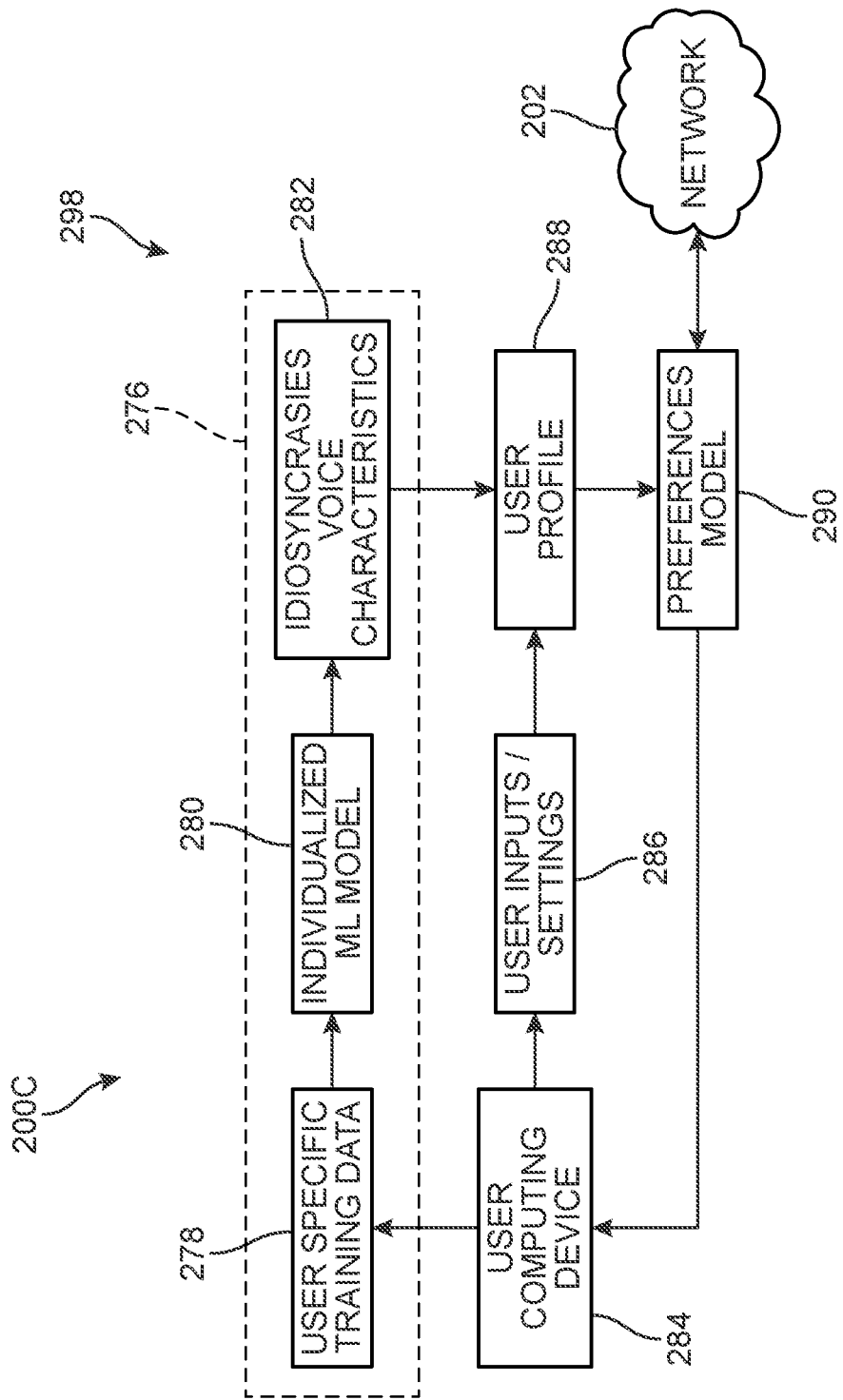

Referring now to FIGS. 2A-2C, an overview of an embodiment of an environment 200a, 200b, and 200c (collectively referenced as 200) for implementing the systems and methods disclosed herein is depicted. The environment represents a process and system for capturing and processing real-time audio data, for example to improve the linguistic ability of a user, and generating near-immediate feedback in response to a detected triggering event in the audio data. In different embodiments, some of the steps may be performed by components of cloud-based computing system(s) and some of the steps may be performed by components of local computing system(s).

In addition, though not shown in the drawings, the proposed systems can include or have access to components enabling intelligent interactions with human users, such as components used in smart virtual assistant technology (e.g., an AMAZON ECHO, a GOOGLE HOME, an APPLE IPHONE, etc.), capable of providing substantially real time synchronous communication sessions between the service and the user. Other examples include NVIDIA®-based technologies such as Jarvis® and conversational AI-based cockpits such as MBUX AI™, as well as NVIDIA® TRT, NVIDIA® AMP, and NVIDIA® TRITON.

A virtual assistant can include provisions for enabling conversations with an end user in a natural manner and make use of conversational AI systems and algorithms. For example, a virtual assistant can include a dialogue management system, a response interface system, and a language generation system. Information received from these units can be converted into a final output intended for the end user. The response interface system may therefore be capable of converting inputs from other systems into text, speech, and/or other kinds of expressions (such as modulated speech, emoticons, text, images, etc.). Thus, the user device may be a computing device used by a user that can enable communication with a virtual assistant. The user device may include a display that provides an interface for the user to input and/or view information, and/or a speaker (or speaker connection) for producing synthesized speech. For example, a user could interact with a virtual assistant using a program run on a laptop computer, such as a text-based chat program, a voice-based communication program, and/or a video-based communication program. One or more resources of a virtual assistant may be run on one or more servers. Each server may be a single computer, the partial computing resources of a single computer, a plurality of computers communicating with one another, or a network of remote servers (e.g., cloud). The one or more servers can house local databases and/or communicate with one or more external databases.

The environment 200 is depicted in three separate drawings for purposes of clarity. In FIG. 2A, a first aspect 200a of environment 200 is illustrated. In this example, it can be seen that a variety of users may engage the services of a smart feedback assistant, including a group 204 (including a first participant 206 (User A), a second participant 208 (User B), and a third participant 210 (User C)), an individual, fourth participant 212 (User D) who has previously used the service, and an individual, fifth participant 214 (User E) who is using the service for the first time, and so has an 'empty' preferences module. With respect to group 204, it can be understood that the three participants are in a meeting and accessing the service via a single computing device (first computing device 216) that may be a shared resource or belong to one of the participants. In other embodiments, two or more of the three participants may have their own devices running individual instances of the service during the meeting. In some embodiments, the fourth participant 212 and/or the fifth participant 214 may be remote members of the group 204 who are meeting in person. In other embodiments, the fourth participant 212 (via a second computing device 218) and/or the fifth participant 214 (via a third computing device 220) may be using the service for assistance in their own, individual goals. Examples of such group dynamics and individual dynamics in relation to the proposed embodiments that may be implemented by the arrangement shown in FIG. 2A are presented below in FIGS. 4A-5B and 7A-11D.

In different embodiments, the computing devices 216, 218, and 220 can refer to a variety of computing device types, such as but not limited to a desktop computer, laptop, notebook, tablet, smartphone, smartwatch, etc. Each device can include an electronics unit comprising a plurality of different components, such as a user interface component (e.g., a touchscreen display, keyboard, mouse, microphone, speaker, etc.), a user interface module, a processor, and/or a communication module. As used in this description, the term "module" is intended to include, but is not limited to, one or more computers, processing units, or devices configured to execute one or more software programs that include program code that causes a processing device(s) or unit(s) of the computer to execute one or more functions. The device may include a system including one or more processors and memory. Memory may comprise a non-transitory computer readable medium. Instructions stored within memory may be executed by the one or more processors. The device may be configured to receive and analyze data from various input sensors associated with the device or data that is communicated from external components or devices connected to the device.

A communication module may allow the device to communicate wirelessly. In this case, the communication module is illustrated as enabling access to a wireless network 202; however, wired connections may also be used. For example, the communication module may include a wired serial bus such as a universal serial bus or a parallel bus, among other connections. The communication module may also include a wireless connection using Bluetooth® radio technology, communication protocols described in IEEE 802.11 (including any IEEE 802.11 revisions), Cellular technology (such as GSM, CDMA, UMTS, EV-DO, WiMAX, or LTE), or Zigbee® technology, among other possibilities. In one embodiment, the service is configured to be available completely offline, such that all features and components described for the application reside locally on the user's computing device.

User interfaces for APIs (application programming interfaces) can be used to facilitate an end user's interaction with, for example, a distributed computing environment (e.g., a web-based application), or an application residing wholly on a single computer system (e.g., a stand-alone application). In different embodiments, one or more of the computing devices can include a device display ("display") that can, for example, present information and media for a software application ("app"). In some embodiments, the app is associated with or is a platform providing the smart feedback assistant service. In some cases, user devices may run client software through a web browser, in which case the client software may be hosted on a server associated with computer system. In other cases, user device may run client software in the form of a native software application that has been downloaded through a centralized marketplace (i.e., an "app store"). In some embodiments, the app can be otherwise downloaded to be accessible locally on the device. In some cases, while the client software that allows users to perform various tasks may be run on user device, some of the software data may be retrieved from and stored on databases associated with a remote server.

In some embodiments, participants can receive and send information through a user interface that may be presented on the device display. In some embodiments, the display may be a touchscreen, allowing the customer to interact with the user interface directly by touch. The user interface may refer to an operating system user interface or the interface of one or more software applications that may run on the device. In some embodiments, the user interface can include a messaging window or other chat-space by which the assistant may present messages or other digital content or the user may provide input. In addition, the app is configured to receive user voice inputs via an audio input device such as a microphone. In some embodiments, the app can offer a user settings and profile interface for accessing and modifying settings and viewing application activity. Selections made from the profile interface can include app-related user-specific information such as user settings, the user's selected trigger event preferences, user's desired alert preferences (e.g., SMS messages, in-app messages, audio alerts, visual alerts, frequency of alerts, etc.) for each user device and/or type of triggering event, as well as an optional app activity history repository that can store and present to the user various data reflecting past app-based feedback or other responses. In some embodiments, the app can be configured to connect to the cloud (for example, via a Wi-Fi or cellular connection) to add or modify information for the user account that can also or alternatively be stored in the cloud, for example in a user account database.

As a general matter, an "interface" may be understood to refer to a mechanism for communicating content through a client application to an application user. In some examples, interfaces may include pop-up windows that may be presented to a user via native application user interfaces (UIs), controls, actuatable interfaces, interactive buttons or other objects that may be shown to a user through native application UIs, as well as mechanisms that are native to a particular application for presenting associated content with those native controls. In addition, the terms "actuation" or "actuation event" refers to an event (or specific sequence of events) associated with a particular input or use of an application via an interface, which can trigger a change in the display of the application.

Furthermore, a "native control" refers to a mechanism for communicating content through a client application to an application user. For example, native controls may include actuatable or selectable options or "buttons" that may be presented to a user via native application UIs, touch-screen access points, menus items, or other objects that may be shown to a user through native application UIs, segments of a larger interface, as well as mechanisms that are native to a particular application for presenting associated content with those native controls. Voice control can also be used to actuate options. The term "asset" refers to content that may be presented in association with a native control in a native application. As some non-limiting examples, an asset may include text in an actuatable pop-up window, audio associated with the interactive click of a button or other native application object, video associated with a teaching user interface, or other such information presentation.

In FIG. 2A, a first smart virtual assistant (SFA) service 292, including an instance of a first SFA app ("App A") 224, is being accessed by first computing device 216, a second SFA service 294, including an instance of a second SFA app ("App B") 228, is being accessed by second computing device 218, and a third SFA service 296, including an instance of a third SFA app ("App C") 232, is being accessed by third computing device 220. In addition, as will be discussed in greater detail in FIGS. 2B and 2C, each individually accessed SFA service includes or has access to a preferences module. For purposes of reference, first SFA service 292 has access to a first preferences module ("Module A") 226, second SFA service 294 has access to a second preferences module ("Module B") 230, and third SFA service 296 has access to a third preferences module ("Module C") 234.

In different embodiments, one or more of the SFA service may be stored locally on the user computing device, may be entirely stored in a cloud computing environment and run on the local computing device, or may include components residing on the local device and components residing in the cloud environment. The dotted lines in FIGS. 2A and 2C represent the potential for the service to have one or more components that can be configured to reside in a local computing device and/or in a cloud network environment. In other words, various components described below with respect to FIGS. 2B and 2C may be included in the locally stored SFA service on the computing device. Thus, while for purposes of illustration, the service components are shown as being accessed via network 202 in FIGS. 2A-2C, in other embodiments, no network connection may be needed. Thus, one or more of computing devices 216, 218, and 220 can access an SFA service, either locally or via network 202.

In different embodiments, input devices (such as a microphone, touchscreen, mouse, trackpad, keyboard, etc.) for the computing devices 216, 218, and 220 can be used to collect user data. The user data is communicated to the SFA app (e.g., App A, App B, App C) with which the user is interacting. For purposes of this example, the user data primarily includes audio data of the user speaking, though in other embodiments the user data can include visual and/or text-based content or other user selections/inputs.

In FIG. 2B, a second aspect 200*b* of environment 200 is illustrated. FIG. 2B includes a representation of some components of an embodiment of the SFA service. In some embodiments in which the service at least partially resides outside of the local computing device, the app can communicate audio data to an optional remote user accounts database 248 for processing, analysis, and storage. In one embodiment, the user accounts database 248 is a content library that stores account data related to one or more users. The data may include, for a plurality of users, name, personal and professional details, preferences, current and past history for the user, payment information, among other details, depending in part on the type of services being provided by the SFA. In one embodiment, user accounts database 248 includes a registry of computing devices for each end-user subscribed to SFA service. For example, a user may own or use multiple computing devices from which the SFA is accessed. The registry identifies one or more devices associated with the user. The end-user has also provided consent to the system for sharing data between each of these registered devices as appropriate. In some embodiments, some or all of the data collected from clients will be encrypted to ensure privacy.

In embodiments where the service resides locally, the audio data may be received by a local version of an SFA machine learning model that will be initially pre-trained by a large corpus of data and then adapted to the needs of a specific user of that device and app. Alternatively or additionally, the app can in some embodiments access a central SFA machine learning model ("central model") 250 that is initially trained by a large corpus of data and then continuously updated and re-trained as additional user data is collected from the individual app instances, and then made available to the users of the app. In some embodiments, the initial or updated central model 250 will generate the settings and configuration that will initially serve as the default preferences and operation profile for the app experience. The user can manually make changes to the configuration for the instance of the SFA running on their device(s), and/or the app will continue to collect user data in an ongoing fashion order to automatically modify and customize the model for the user's needs.

In one embodiment, in cases where there has been no or otherwise insufficient user activity at the time of the user login for the system to determine the user's preferences, it can be understood that the system can be configured to refer to the default model or to a version of the default model selected based on the model's usage by a subset of users of the same application that match the device user's demographics, and whose preferences are known at the time of usage. This can serve as a more tailored initial or default user experience in some cases, from which training of the intelligent system can occur. Such an approach would be the case, for example, for the User E in FIG. 2A, who is using the service for the first time. This could occur, for example, when the client device downloads the application via the web for the very first time, or an existing video conferencing application shares an update that includes the app as a plugin. In different embodiments, the central model can receive updated training data (e.g., upload of additional deidentified features to the server as more audio data or users interact with the app) to continue to improve the model. In one example, if an improved general model becomes available, the app is configured to trigger an automatic download of the updated model to the client side.

In some other embodiments, a centralized knowledge base 238 may be maintained in the cloud environment, and serve as a central repository of information about possible triggering events 242 (see FIG. 3), response options 244, and collective user interaction history 246. In some other embodiments, a featurizer may initially deidentify data and process and convert the data to model consumable features. In some embodiments, each local instance of the SFA alternatively or additionally includes or has access to a personalized interruption AI knowledge base ("knowledge base") that stores and manages the user's preferences 240 and selections as applicable to triggering events, response options, and/or interaction history. In different embodiments, the knowledge base is additionally or alternatively in communication with a preferences generation system 298 that will be discussed with reference to FIG. 2C below.

As a general matter, the response options 244 include a wide range of configurations by which the SFA can be instructed to interact with users. Some examples of these response options will be discussed below with reference to FIGS. 4A-5B, and 7A-11C. In some embodiments, the knowledge base 238 can further include instructions regarding the possible responses that may be generated and presented by the SFA once an interruption has been deemed necessary by the central model 250. In other embodiments, the various responses (e.g., automatic feedback specific to the occasion warranting the interruption) can be stored in a separate module for use by the SFA. Interaction history may be understood to refer to any user data that has been collected and includes user experiences and training events, typically stripped of any identifier information.

As noted earlier, central model 250 can in some embodiments generate a default mode for the operation of the SFA, providing default preferences in the operation of the SFA, for example for new users. The default mode can continue to be applied if the user does not wish to submit any additional data for a more personalized experience (see FIG. 2C). In order to provide the features described herein, the central model 250 can be trained on data obtained from a number of sources. In different embodiments, the central model 250 can refer to a deep neural network (DNN) model, including deep learning models with multiple layers of many connected nodes (e.g., perceptrons, Boltzmann machines, radial basis functions, convolutional layers, etc.) that can be trained with enormous amounts of input data to quickly solve complex problems with high accuracy. In one example, a perceptron may receive one or more inputs that represent various features of a data object that the perceptron is being trained to recognize and classify, and each of these features is assigned a certain weight based on the importance of that feature in defining the data object. Once the DNN is trained, the DNN can be deployed and used to identify and classify patterns via inference techniques.

As noted above, a deep learning or neural learning system needs to be trained to generate inferences from input data. In at least one embodiment, inference and/or training logic may include, without limitation, a data storage to store forward/backward and/or input/output weight and/or input/output data corresponding to neurons or layers of a neural network trained and/or used for inferencing in aspects of one or more embodiments. In at least one embodiment data storage stores weight parameters and/or input/output data of each layer of a neural network trained or used in conjunction with one or more embodiments during forward propagation of input/output data and/or weight parameters during training and/or inferencing using aspects of one or more embodiments. In at least one embodiment, any portion of data storage may be included with other on-chip or off-chip data storage, including a processor's cache or system memory.

In some embodiments, an untrained neural network—e.g., the initial version of central model 250—is trained using a training dataset comprising one or more of speech samples 266 and regional samples 274, which will be discussed in detail below. In at least one embodiment, the training framework is a PyTorch framework, whereas in other embodiments, the training framework is a Tensorflow, Boost, Caffe, Microsoft Cognitive Toolkit/CNTK, MXNet, Chainer, Keras, Deeplearning4j, or other training framework. In at least one embodiment the training framework trains an untrained neural network and enables it to be trained using processing resources described herein to generate a trained neural network. In at least one embodiment, weights may be chosen randomly or by pre-training using a deep belief network. In at least one embodiment, training may be performed in either a supervised, partially supervised, or unsupervised manner.

In at least one embodiment, untrained neural network is trained using supervised learning, wherein the training dataset includes an input paired with a desired output for an input, or where training dataset includes input having known output and the output of the neural network is manually graded to teach the model what types of situations should trigger an interruption of the user's speech by the SFA. In at least one embodiment, untrained neural network is trained in a supervised manner processes inputs from the training dataset and compares resulting outputs against a set of expected or desired outputs. In at least one embodiment, errors are then propagated back through untrained neural network. In at least one embodiment, the training framework adjusts weights that control untrained neural network. In at least one embodiment, the training framework includes tools to monitor how well untrained neural network is converging towards a model, such as trained neural network, suitable to determining occasions in which an interruption is warranted, based on known input data. In at least one embodiment, the training framework trains an untrained neural network repeatedly while adjusting weights to refine an output of untrained neural network using a loss function and adjustment algorithm, such as stochastic gradient descent. In at least one embodiment, the training framework trains an untrained neural network until the untrained neural network achieves a desired accuracy. In at least one embodiment, the trained neural network can then be deployed to implement any number of machine learning operations.

Similarly, in at least one embodiment, an untrained neural network is also or alternatively trained using unsupervised learning, wherein the untrained neural network attempts to train itself using unlabeled data. In at least one embodiment, an unsupervised learning training dataset will include input data without any associated output data or "ground truth" data. In at least one embodiment, the untrained neural network can learn groupings within the training dataset and can determine how individual inputs are related to the untrained dataset. In at least one embodiment, unsupervised training can be used to generate a self-organizing map, which is a type of trained neural network capable of performing operations useful in reducing dimensionality of new data. In at least one embodiment, unsupervised training can also be used to perform anomaly detection, which allows identification of data points in a new dataset that deviate from normal patterns of new dataset.

In still other embodiments, semi-supervised learning may be additionally or alternatively used, referring to a technique in which in a training dataset includes a mix of labeled and unlabeled data. In at least one embodiment, the training framework may be used to perform incremental learning, such as through transferred learning techniques. In at least one embodiment, incremental learning enables the trained neural network to adapt to new data without forgetting knowledge instilled within network during initial training.

As shown in FIG. 2B, two main sources of training data for the service include speech samples 266 and regional samples 274. The speech samples 266 refer to standard speech corpora, which are used to train standard acoustic models, other speech data that may be collected during development of the mode, as well as learners' non-standard speech corpora with experts' detailed annotations, which are used to train and evaluate speech models 252 whose output will be used by the central mode 250 when determining whether a triggering event has occurred. In order for unlabeled speech samples 266 (i.e., speech without accompanying text) to be used as training data for the speech models 252, a natural language processor (NLP) 268 may be applied in order to generate automatically labeled data 270, such as a speech-to-text processor. This data, which may increase in size as more samples are collected, is then provided to a training data module 272 for use by the central model 250.

As a general matter, NLP techniques may be used to process sample speech data as well as to interpret the language, for example by parsing sentences, and determining underlying meanings of the words. Embodiments can make use of any techniques already known in the field of natural language processing (NLP). These include any techniques in speech recognition and natural language understanding. As one non-limiting example, the system can include the computing resources to conduct natural language processing (NLP) on received speech audio files. For example, the NLP applied by the system may include machine translation of the received speech audio files to obtain a translation of the speech captured by the received speech audio files into written text. The machine translated text may then be analyzed according to one or more NLP analyses such as text summarization and/or sentiment analysis. The NLP analyses may comprise implementing sentence breaking rules on the machine translated text to break up the text into smaller chunks of text such as paragraphs and individual sentences. The NLP analyses may further comprise tagging parts of speech identifiers (e.g., noun, verb, article, adjective) to the words that comprise a chunk of text. The NLP analyses may further comprise parsing the text to create one or more parsing tree that outline different possible interpretations for a chunk of text. The NLP analyses may further comprise terminology extraction that extracts one or more key terms from a chunk of text to better understand the context of the text. The NLP analyses may further comprise language translation capabilities to translate text from one language to another.

In different embodiments, regional samples 274 can include data such as audio segments of local news broadcasting programs, as well as other media sources for the region in which the user is located and/or has selected as his or her preference. In some cases, speech data from standardized assessments of language skills (e.g., TOEFL®, IELTS™) or speech recorded by mobile-assisted language learning (MALL) apps (e.g., DUOLINGO), in which written text was read aloud by students, may be included. Similarly, sources for which closed captioning is available (TV programs, movies, broadcast media, online videos or podcasts, etc.) may also be used in order to train the language models 254. This data, which may be updated over time as more samples are made available, is also provided to training data module 272 for use by the central model 250.

For purposes of this application, a speech irregularity refers to deviations from the standard rules, expressions, or expectations for a language. There are several types of linguistic irregularities that may occur, including mispronunciations, lexico-grammatical inaccuracies, prosodic errors, semantic errors, incorrect phraseology, and speech disfluency. Lexico-grammar can be understood to refer to the relationship between words (or lexical items or chunks) and their grammatical structures, including vocabulary appropriate for a particular grammatical context or environment, and grammar appropriate for a particular lexical context or environment. Prosody refers to intonation, stress pattern, loudness variations, pausing, and rhythm, and is usually expressed by varying pitch, loudness, speed, and duration, as well as a change in articulatory force to emphasize a word or phrase. Thus, prosodic errors generally refer to inappropriate usage of pitch, loudness, duration, speed, or articulatory force, including but not limited to speech that sounds aprosodic, dysprosodic, slow or choppy, or too fast. Semantic errors include misuse of prepositions, verb phrases, or other word confusions (when a person uses one word that has a similar meaning as another word such as lamp and light and confuses the two as they speak). Furthermore, phraseology refers to the formulaic sequences of words, including idiomatic phrases and proverbial expressions. Speech disfluency includes the user of filler words or sounds (e.g., urn, ah, er, uh, etc.) and false starts, restarted phrases or repeated syllables, etc.

In FIG. 2B, it can be seen that speech models 252 can include one or more of language proficiency recognition models ("language models") 254, emotion recognition models ("emotion models") 256, and content evaluation models ("content evaluator") 298, each of which can produce output that will be used by the central model 250 when determining whether an interruption should occur. Language models 254 may be understood to encompass one or more of acoustic models, language models, and scoring models. The inclusion of these three models makes accurate automated speech scoring possible. As a general matter, an acoustic model is a component of the speech recognizer. Typically, speech recognition software applies hidden Markov models (HMMs) to represent each phone, or sound. Recognition is based on a series of probabilities, and the model estimates the likeliest phoneme or word from among a number of possibilities. Spectral features are extracted for each frame of the speech, and a model associates probabilities for each possible phone. The output is the best statistical estimate of which words were spoken. Acoustic models must be "trained" or optimized on a set of speech data. The training process involves pairing the audio speech with transcriptions of that speech, so that the model associates sounds with orthographic representations. The acoustic model should be trained on speech that matches the speech to be recognized, for example per speech samples and regional samples 274. Speakers' accents are therefore a crucial factor, as each potential user demographic may have a distinct pronunciation repertoire. Thus, the proposed system is configured to obtain speech data and train the acoustic model on a sample that matches the target population of the user's target language.

In addition, a language model comprises words that are likely to be spoken in the response. The model is typically made of frequencies for n-grams. Thus, if the language task is to describe a picture of a girl eating an apple, the bigram "an apple" and the trigram "eating an apple" are likely to appear frequently in user responses. The language model assists in the assigning of probabilities in the word recognition process.

Scoring models refer to the method for selecting features from the speech recognition process and applying them to predict human ratings. In language assessment, the test developer should consider not only features of the output which are the best predictors of the human score, but also which predictors are relevant to the human score. For example, a duration measure such as speech rate can be a strong statistical predictor of human judgments of grammar ability. The Versant tests provide several kinds of scoring models. Pronunciation models can be developed from spectral properties that are extracted during the recognition process. For example, rhythmic and segmental aspects of a performance are defined as likelihoods with reference to a set of native speaker utterances, and then these measures are used in non-linear models to predict human judgments of pronunciation. Fluency models are similarly developed from durations of events, such as response latency, words per time, segments per articulation time, and inter-word times. Sentence mastery is mainly derived from the number of word errors given in a response and scaled using a partial credit Rasch model. Vocabulary items which elicit single words or phrases use the recognized output to ascertain whether the response was correct or incorrect, and the result is entered into dichotomous Rasch models. In constructed responses, such as retelling a story, the recognized output is used in a Latent Semantic Analysis approach to predict human judgments of vocabulary coverage. Thus, the Versant tests attempt to preserve construct validity by using distinct, relevant features in models to predict each trait separately, and then combine the sub-scores to create an overall score. In other examples, such as SpeechRater$^{SM}$, numerous features associated with pronunciation, fluency, and vocabulary are entered into a regression model to predict holistic scores on the speaking tasks, rather than individual traits.

Furthermore, in different embodiments, language models 254 can include but are not limited to automatic pronunciation error detection (APED) models. In general, the goal of an APED system is to find effective confidence measures and combined features, which can produce higher scores for standard pronunciation, but lower scores for non-standard pronunciation. If these scores are lower than certain thresholds, they can be detected as pronunciation error, or these scores are fed into the trained classifier to determine whether the pronunciation is correct. The approach based on acoustic phonetics usually regards the problem of APED as the problem of comparison or classification. Therefore, based on the statistical analysis of phonetics, it first extracts all kinds of features at the segment, including acoustic features, perceptual features, and structural features, and then finds discriminative features or combined features from them. Finally, using these features, an advanced classifier or comparator is built for a specific APED task on a specific set of phones. The acoustic-phonetic-based methods have been deeply integrated with the Automatic Speech Recognition (ASR)-based methods and they have been shown to complement each other. With the help of state-of-the-art ASR technology, the accurate segmentation of multi-level segments on the large-scale corpus and the robust confidence measures are achieved. Discriminative features are constructed by using acoustic—phonetic knowledge and refined acoustic models. These multi-type complementary features feed in a well-structured classifier, thus improving the accuracy of APED in a well-rounded way.

In addition, language models 254 can include automated speech scoring systems, whereby the computer system assigns a speaking proficiency score to speech. The task typically involves generating a mapping function from the speech signal to a speaking proficiency score, whereby scores usually generated by human raters are used as the gold standard to train the system. Most automated speech scoring systems contain three main components: an automatic speech recognition (ASR) system that generates word hypotheses for a given speech sample along with other information, such as the duration of pauses between words; a set of modules based on digital signal processing and natural language processing (NLP) technologies that compute a number of features measuring various aspects of speech considered relevant by language assessment experts (e.g., fluency, pronunciation, grammatical accuracy); and a scoring model that maps features to a score using a supervised machine learning paradigm. In some embodiments, the output of the automated speech scoring system can be used by the central model 250 to determine whether a triggering event has occurred.

More generally, language models 254 may also include features of computer-assisted language learning (CALL)

systems, and more specifically, CALL systems with a focus on speech and pronunciation, also referred to as computer-assisted pronunciation training (CAPT) systems. CAPT systems can efficiently process and analyze the speech uttered by language learners and then provide the quantitative or qualitative assessment of pronunciation quality or ability to them as feedback. This process is also known as the automatic pronunciation (quality/proficiency) assessment (evaluation/scoring). A CAPT system accurately detects pronunciation errors in the utterances produced by language learners, diagnoses the types and locations of pronunciation errors, and then provides corrective feedback and operational guidance for improvement. The output of such systems can be used by the central model 250 to determine what feedback response is appropriate once a triggering event has occurred. Some non-limiting examples of such systems include SpeechRater[SM], Carnegie Speech Assessment and NativeAccent, eduSpeak SDK, Arizona English Language Learner Assessment, Duolingo®'s Duolingo English Test, Pocketsphinx.js, among others.

In different embodiments, the central model 250 may also be configured to identify triggering events based on predicted emotional-cognitive states of the speakers. For example, in some embodiments, the service may include or have access to output of one or more emotion models 256. In different embodiments, emotion models 256 can interpret the emotional state of humans and inform the model so as to determine triggering events based on the determined disposition of the user making the speech. In general, emotional speech processing technologies recognize the user's emotional state using computational analysis of speech features. Vocal parameters and prosodic features such as pitch variables and speech rate can be analyzed through pattern recognition techniques. Typically, there are two components of emotion recognition based on speech: the simultaneous analysis of the content of speech and of the speech features. The semantic component of this kind of analysis counts the incidence of words with emotional and cognitive connotation.

For example, when a person starts talking, they generate information in two different channels: primary and secondary. The primary channel is linked to the syntactic-semantic part of the talking (what the person is literally saying), while the secondary channel is linked to paralinguistic information of the speaker (tone, emotional state, etc.). A basic classification includes 'positive' vs. 'negative' states of mind (i.e., positive emotions including happiness and joy, negative emotions including sadness, fear, anger, disgust, contempt, as well as surprise or neutral (absence of emotion). Cognitive states can likewise be assessed, such as degree of focus, memory problems, dementia, speech-based disabilities, etc. The performance and robustness of the emotion recognition systems will be easily affected if it is not well trained with a suitable database. Therefore, it is essential to have sufficient and suitable phrases in the database to train the emotion recognition system and subsequently evaluate its performance. Generally, three main types of databases may be used to train emotion models: acted emotions, natural spontaneous emotions, and elicited emotions. As some non-limiting examples, the emotion models 256 can include features from one or more available emotion models such as Beyond Verbal™, Vokaturi™, EmoVoice™, Good Vibrations™, among others. Other technologies that incorporate holistic speaker modeling and architectures, semi-supervised learning, synthesized training material, and data learned features can also be used by the service.

In different embodiments, the central model 250 may also be configured to identify triggering events based on the content of the speech. For example, in some embodiments, the service may include or have access to output of one or more content evaluators 298. In different embodiments, content evaluators 298 can review the spoken words for accuracy and determine if there is a high likelihood of misinformation. For example, content can be analyzed in near-real-time by extracting relevant features (e.g., bag of words, N-grams, psycholinguistic factors, syntactic and semantic features, etc.). In some non-limiting examples, the content evaluators 298 can incorporate models based on techniques relying on naïve Bayes (with n-gram), deep learning (e.g., CNN, LSTM, Bi-LSTM, C-LSTM, HAN, and Convolutional HAN), BERT, among others. In another example, the content evaluators 298 can review the spoken words and compare the content to content previously presented during the session in order to determine whether the content includes information that has been previously discussed or raised. In another embodiment, the content evaluators 298 can review the spoken words for content that is off-topic or otherwise undesirable based on the current user preferences. The central model 250 can then determine triggering events based on the output of content evaluators 298 (see also FIGS. 5A, 5B, and 7A-10D).

In different embodiments, the central model 250 may be improved over time as training data generated by the individual devices running the service are obtained. In such cases, data from each user device will be collected over a period of time. Once a sufficient number of datasets have been collected, the data can be shared as training data for central model 250. For example, a federated learning module 258 can be configured to generate data sets that are distributed across multiple devices while preventing data leakage for the central model 250. Thus, after the model is trained the server-based app will wait for aggregation to "build up" from the clients in order to employ Federated Learning that will improve the quality of the trained model over time. After the data has accumulated and features are communicated to the server via the individual client devices, the server can train an improved iteration of the initial model. The new model represents an improved and more effective model that may be implemented for new users or users that do not wish to create a personalized profile.

In one example, the first computing device 216, the second computing device 218, and the third computing device 220 (see FIG. 2A) can implement one or more features provided by the SFA service. Each device will accumulate data over several days, weeks, or months or longer and this data (raw or processed) will be sent to the federated learning module 258. In some embodiments, the approach involves learning a single, global statistical model (central model 250) from data stored on tens to potentially thousands or millions of remote devices, herein referred to as nodes 260. Embodiments may apply architectures implementing one or more of horizontal federated learning, vertical federated learning, federated transfer learning (FTL), Multi-Participant Multi-class Vertical Federated Learning framework (MMVFL), FEDF, PerFit, FADL, and Blockchain-FL, PySyft, Tensor Flow Federated (TFF), Federated AI Technology Enabler (FATE), Tensor/IO, Functional Federated Learning in Erlang (FFL-ERL), CrypTen, LEAF, or other available federated learning techniques. These techniques are used to prepare the data and then are provided to central model 250 as additional or replacement training data for training data module 272, increasing the model's effectiveness and accuracy.

Once the central model 250 determines a triggering event has occurred as described herein, it may issue instructions to a feedback generator 262 configured to review the audio data and output of speech models 252 to generate an appropriate response directed to the aspect of the audio data that was associated with a linguistic or conversational irregularity. The feedback generator 264 then communicates the response to an output module 236, which is configured to cause a presentation of the message as interrupting content via the application running on the user's device, for example via presentation components 262 such as speech synthesizer or visual content renderer.

Referring now to FIG. 2C, a third aspect 200c of environment 200 is illustrated. FIG. 2C includes a representation of some components of an embodiment of the SFA service. In different embodiments, components of a personalized model module ("personalized module") 276 can be located in either or both of the local computing device or cloud platform. The personalized module 276 is configured to communicate with a user's computing device 284 on which the SFA app is being accessed in order to obtain user activity records and selections. The user records will be used as user-specific training data 278 for an individualized ML model ("personal model") 280 that may reside on the user device and/or the cloud platform.

In different embodiments, the personal model 280 is configured to determine idiosyncrasies and speech/voice characteristics ("output") 282, as well as other user-specific patterns that can improve the performance of the SFA, including tasks for which the user commonly uses the SFA, occasions or specific speech interactions in which that the user has verbally indicated he or she does not wish to be interrupted, and other linguistic features. Some non-limiting examples of speech characteristics include language, accent, speech flow, loudness, intonation, and intensity of overtones, as well as various speech traits such as articulation and/or intelligibility, pronunciation, speech pauses, speech tone, and speech rhythm. The user's audio data can be classified by a speech machine learning model to identify/classify speech characteristics or other traits and patterns that may be 'normal' or baseline for the user and can improve the operation of the service.

The output 282 can then be communicated to a user profile module 288, which may also reside on the user's local device and/or in a remote server associated with the application. In some embodiments, the personal model 280 includes or has access to one or more user-specific speech models (e.g., see speech models 252) in order to generate a more nuanced and accurate output. In addition, the app can be configured to present an interface (e.g., on a display or via voice commands) offering a plurality of selectable options for modifying the operation of the SFA, as discussed below. In other words, the user may manually select or update one or more user settings/modes ("selections") 286 that affect the configuration of the app. In one example, the user can select one set of preferences for a first device (e.g., a laptop), and a second set of preferences for a second, different device (e.g., their smartwatch). In different embodiments, the user can indicate when the app should be actively listening and/or interrupting, and periods when it is to disengage. For example, the app may be switched off or disabled for proprietary, IP, or any other confidential meetings. In addition, the app may be configured to perform with one set of preferences for members of a first type of organization (e.g., a tech startup), and apply a different, second set of global preferences for members of a second, different type of organization (e.g., a bank or other financial institution). In different embodiments, the local or personal model can be configured to update its feature repository as new audio data and users interact with the service. The new data will allow the model to continue to fine-tune the original model and develop an improved personalized model for the user.

For purposes of illustration, some non-limiting user-specific preferences might include user preferences such as (a) "Don't interrupt for [SPECIFIC MISTAKE]" such as "Don't interrupt for mispronunciations for the letter B", "Don't interrupt me for stuttering", "Don't interrupt for the same mistake again", "Don't interrupt while I am speaking at all", "Don't interrupt if I use slang", or "Don't interrupt me if I say filler words" such as uh, ah, er, um, etc., as well as "Interrupt only for mispronunciations", and "Interrupt only for grammar and accent corrections"; (b) "Don't interrupt for [SPECIFIC DURATION]" such as "Don't interrupt for the next five minutes", "Don't interrupt me today", and "Don't interrupt me this evening"; (c) "Don't interrupt [PERSON]", such as "Don't interrupt me", "Don't interrupt Joe", "Interrupt me if I speak for longer than 5 minutes", or "Don't interrupt any other person speaking except me" (e.g. based on known voice recognition techniques such as voiceprint and voice authentication); (d) "Don't interrupt [FREQUENCY]" such as "Don't interrupt more than 3 times over each 10 minute interval", "Don't interrupt more than once during each sentence", or "Don't interrupt more than 4 times for pronunciation corrections today"; (e) "Interrupt only when I am [LOCATION/ACTIVITY/DEVICE]" such as "Interrupt only when I am home", "Interrupt only when I am reading Japanese", "Interrupt only when I am using my tablet device", "Do/Don't apply my selections and/or history made at this device to other devices I use", or "Don't interrupt when I am at school"; and (f) "Interrupt only for [TASK]" such as "Only interrupt when I am practicing the southern accent", "My age is 17, interrupt only for mistakes that an average teenager wouldn't make", or "I am a medical doctor, only interrupt me when I say a medical condition incorrectly". These types of preferences can be applicable whether the user is speaking alone or is in a group conversation.

In addition, there may be user preferences more specifically directed to conversations in which there are more than one person present. For example, such preferences could include (a) "Interrupt when someone repeats something someone else already said or has been already covered"; (b) "Interrupt when someone speaks over someone else"; (c) "Interrupt when someone speaks disrespectfully or angrily"; (d) "Interrupt when a main speaker (e.g., a teacher) has spoken for longer than [DURATION]"; (e) "Interrupt when someone speaks over a high school level"; (f) "Interrupt when there is a participant or [person name] who has not spoken in more than 10 minutes"; and (g) "Interrupt when someone speaks in a group meeting for longer than 3 minutes".

Other options can be provided or modified with reference to response options 244 in the knowledge base 238 (see FIG. 2B). The user preferences can be made through options made available in the app, and can change over time, either based on subsequent user activity or selections, or in response to updates to the central model, and in some embodiments, be shared across devices and/or stored in user accounts database via network 202.

These selections 286 are shared with the user profile module 288. Together, the output 282 of personal model 280 and the selections 286 are shared with a user-specific preferences module 290 which is configured to maintain and apply the appropriate app configuration at the user's computing device 284. In some embodiments, the app is configured to guide the user through a setup of the customizable "preferences module" (e.g., what's their native language, how many interruptions from the software does the user want, what kinds of interruptions are okay, etc.). In some embodiments, the individual preferences modules of each client can interact with other clients' preference modules. In such cases, the system can be configured to send notifications via GET and POST protocols. Clients can control if they want the preferences modules to be interactive (e.g., send and receive information from any other client's module).

Thus, in different embodiments, a client uses the initial model with modifications based on the preferences module. Over time, users can build up their personalization data collected by the application and once a certain amount of data is collected, the model is fine tuned to personalize to the user. Fine-tuning training can be carried out on the local machine of the user. The newly fine-tuned model is able to better cater to each user's preferences.

It should be understood that preferences module 290 can be configured to reside in the user's local computing device and/or in the cloud network environment. For example, the speech file may be generated at the local device, and a locally-based preferences module receives the speech file and produces, and continuously updates as new speech files are generated, the user profile and preferences at the user device. Thus, user voice data may be contained and secured locally, rather than being transmitted to a remote location. In some embodiments, only de-identified audio data or processed de-identified data is communicated to external devices or systems for storage in accounts database.

As a general matter, the default model or central model can assess the outputs from the speech models in order to determine if one or more triggering events has occurred in order to present interrupting content. For purposes of this application, interrupting content refers to content generated via the SFA, including audio and visual content, that is presented within a few moments (i.e., near-immediate) of the triggering event, and is presented without regard as to whether a speaker is still speaking. In most cases, interrupting content will typically be presented while there is a person speaking, unless the person has abruptly stopped speaking immediately following their linguistic or conversational irregularity.

Figure 3:
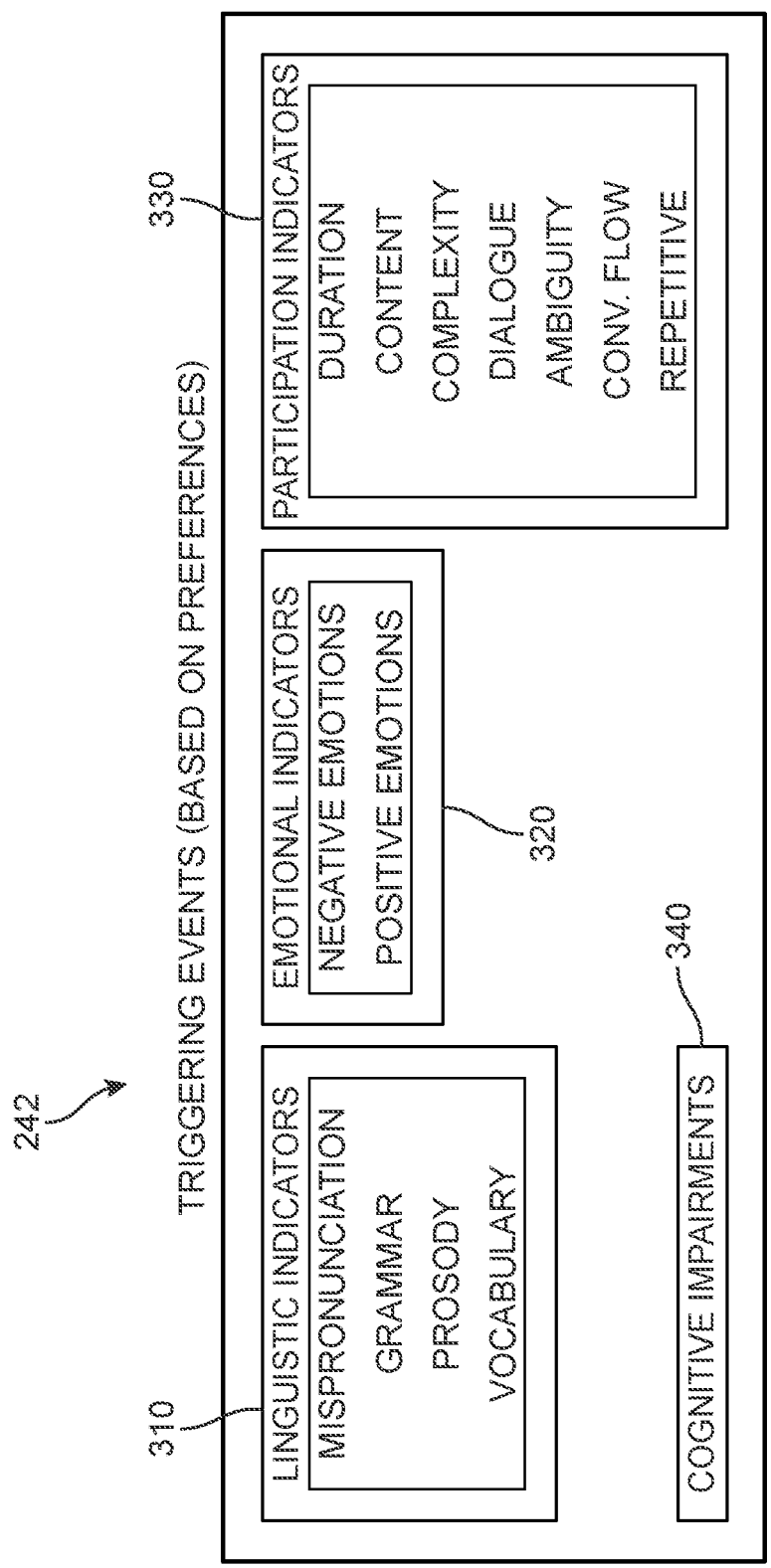
FIG. 3 is a schematic diagram of some examples of triggering events that may cause the system to interrupt a user, according to an embodiment.

As noted in FIG. 2B, there may be specific events that, when detected by the system, are configured to cause an interruption. Some non-limiting examples of possible trigger events 242 that, if detected, can trigger the SFA to interrupt the user are shown in FIG. 3, depicted in three general categories. In a first category are linguistic indicators 310. As discussed earlier, the proposed systems can be applied in cases in which a person is learning a new language, a different accent, or improving their language abilities. Thus, instances of mispronunciation, grammar, prosody, and vocabulary may be triggers for interruption. In addition, emotional state may affect how the SFA interacts with the user. Furthermore, in some embodiments, conversational irregularities may be triggers for interruption (see FIGS. 6A, 6B, and 7A-11D below).

As will be discussed in the embodiments described below, the proposed systems may also be applicable in other environments, such as collaborative dialogues or meetings between two or more persons. In such cases, emotional indicators 320 can be particularly important in determining when an interruption may be warranted. In this second category, detection of specific negative emotions or particular positive emotions can trigger an interruption. For example, the SFA may serve as a moderating presence during a meeting, 'stepping in' when speech becomes heated or otherwise has an undesirable tone by detecting of anger.

Similarly, in some embodiments, the model can be trained using a third category, such that participation indicators 330 such as duration, complexity, dialogue, ambiguity, conversational flow, and repetitiveness can cause an interruption to be presented by the SFA. Triggering events related to participation indicators 330 can also be referred to as conversational irregularities. For example, a person who speaks too long, or with too much complexity or ambiguity can be interrupted in order to provide other participants an opportunity to speak. In addition, if the dialogue includes repetitive aspects, people are speaking over or interrupting one another, or the conversation is not following the proposed agenda, the system can trigger an interruption. It may be appreciated that cognitive impairments 340 may be detected based on one or more of the indicators for these three categories. Furthermore, for purposes of this application, the determination that a speech irregularity has occurred will typically be based on the detection of linguistic indicators 310 and/or emotional indicators 320, while the determination that a conversational irregularity has occurred will typically be based on the detection of participation indicators 330 and/or emotional indicators 320. However, there may be cases where there is overlap between the two, such that a speech irregularity may also or alternatively be determined based on participation indicators 330 and conversational irregularities may also or alternatively be determined based on linguistic indicators.

In some embodiments, it can be understood that the model can be configured to determine a triggering event such as interruption, negative emotions, etc. occurs only when there have been multiple instances of the indicator during the conversation and/or during a period of time (e.g., model may not interrupt when a person goes off-topic once, but will interrupt if the same person goes off-topic a second time). In addition, in some embodiments, the triggering event can be based on a combination of these indicators. In other words, where a first instance of interruption by a first person during a conversation with a second person may not be sufficient on its to warrant an interruption by the model, and a first instance of a raised voice by the first person may not be sufficient on its own to warrant an interruption by the model, a combination of these two indicators (the first person interrupting the second person in a raised voice) can in combination represent a trigger event that causes the model to interrupt the conversation.

Figure 4D:
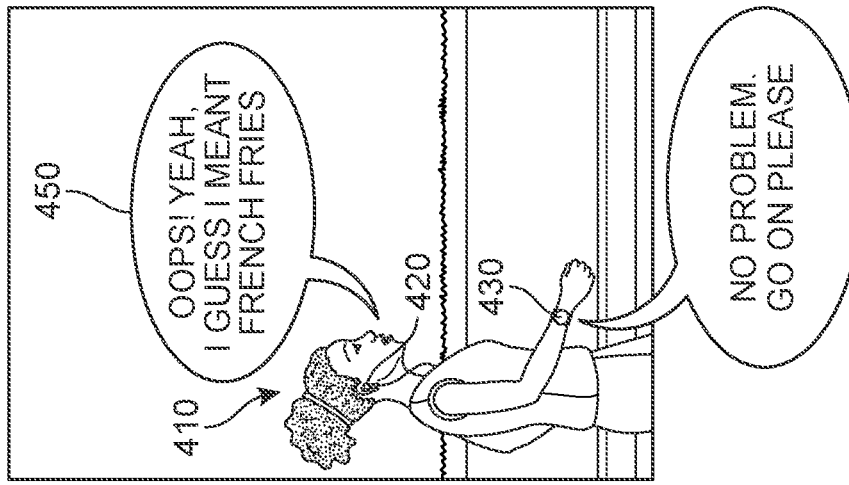
Figure 4E:
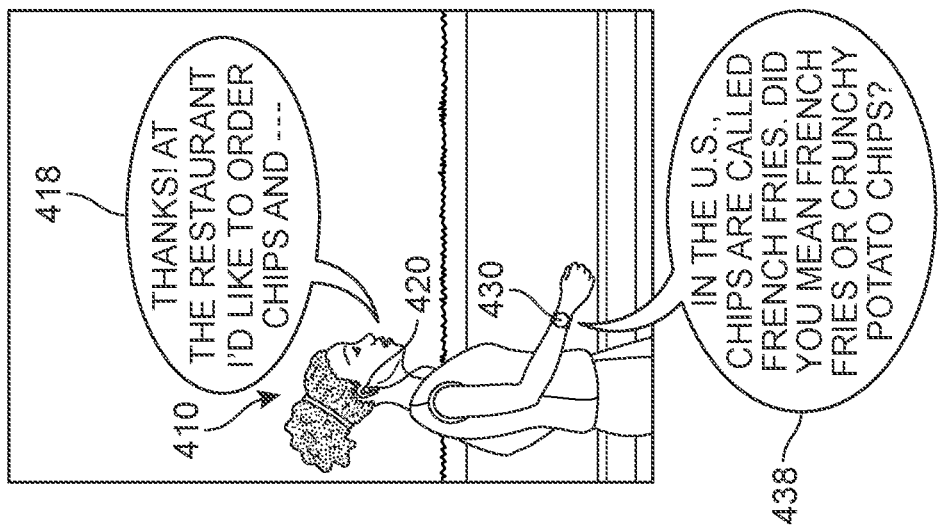

Referring now to FIGS. 4A-4E, an example scenario in which a jogger 410 employs an implementation of the SFA service is depicted over a sequence of five figures. In FIG. 4A, the jogger 410 is shown wearing an SFA-equipped smartwatch device 430 on her wrist, and headphones 420 in her ears. As she exercises, jogger 410 is practicing her English language skills. In this example, she begins with a first utterance 412 ("So when I am going to a risterwant to -") in which she mispronounces a word. The SFA detects this mispronunciation and determines interrupting content that should be presented, in this case as a first feedback 432 ("Meg, rather than risterwant, try restaurant"). In FIG. 4B, jogger 410 continues by attempting to repeat the statement in a second utterance 414 ("Restuhant, OK. So when -"). The SFA immediately interrupts her in order to provide a corrective second feedback 434 ("Let's try it again. Restaurant."). In response, as shown in FIG. 4C, the jogger 410 begins again with a third utterance 416 ("So when I am going to a restaurant -"). In some embodiments, the SFA can also be configured to provide positive feedback, in a manner similar to a human tutor. In this case, the SFA interrupts with a third feedback 436 ("Great job") allowing jogger 410 to immediately feel her efforts rewarded. In FIG. 4D, the jogger 410 continues with a fourth utterance 418 ("Thanks! At the restaurant I like to order chips and -"). In some embodiments, the SFA can be configured to offer regional-specific guidance. In this case, the SFA interrupts with a fourth feedback 438 ("In the US, chips are called French fries. Did you mean French fries, or crunchy potato chips?"). As shown in FIG. 4E, the jogger 410 is appreciative of this guidance, acknowledging with a fifth utterance 450 ("Oops! Yeah I guess I meant French fries"), and the SFA responds with an acknowledgment 440 ("No problem. Go on please"). Thus, it can be appreciated that individualized language learning can be provided as an on-the-go independent mobile system. In other embodiments, feedback can also or alternatively be presented on a display, for example, as an audio waveform comparison between the user's speech and the target speech, or phonetic spelling of word(s).

Figure 5A:
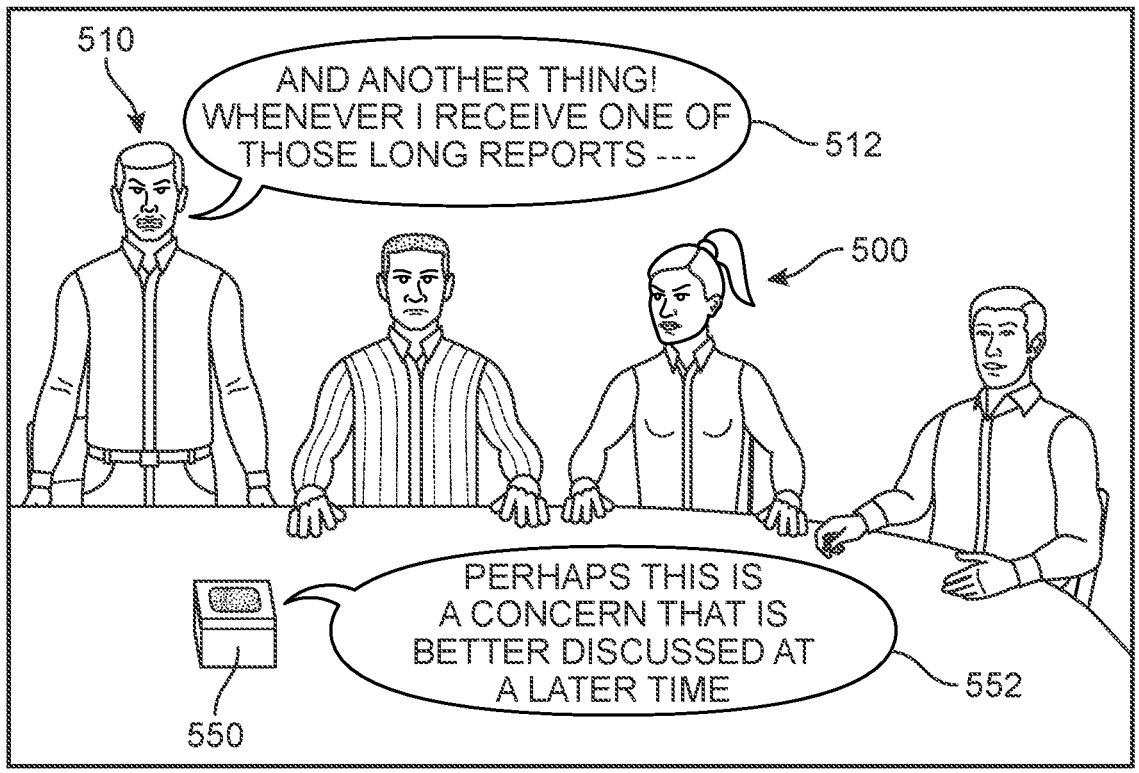
FIGS. 5A and 5B present an example of a smart feedback assistant interrupting a discussion to provide moderation during the conversation, according to an embodiment.
Figure 5B:
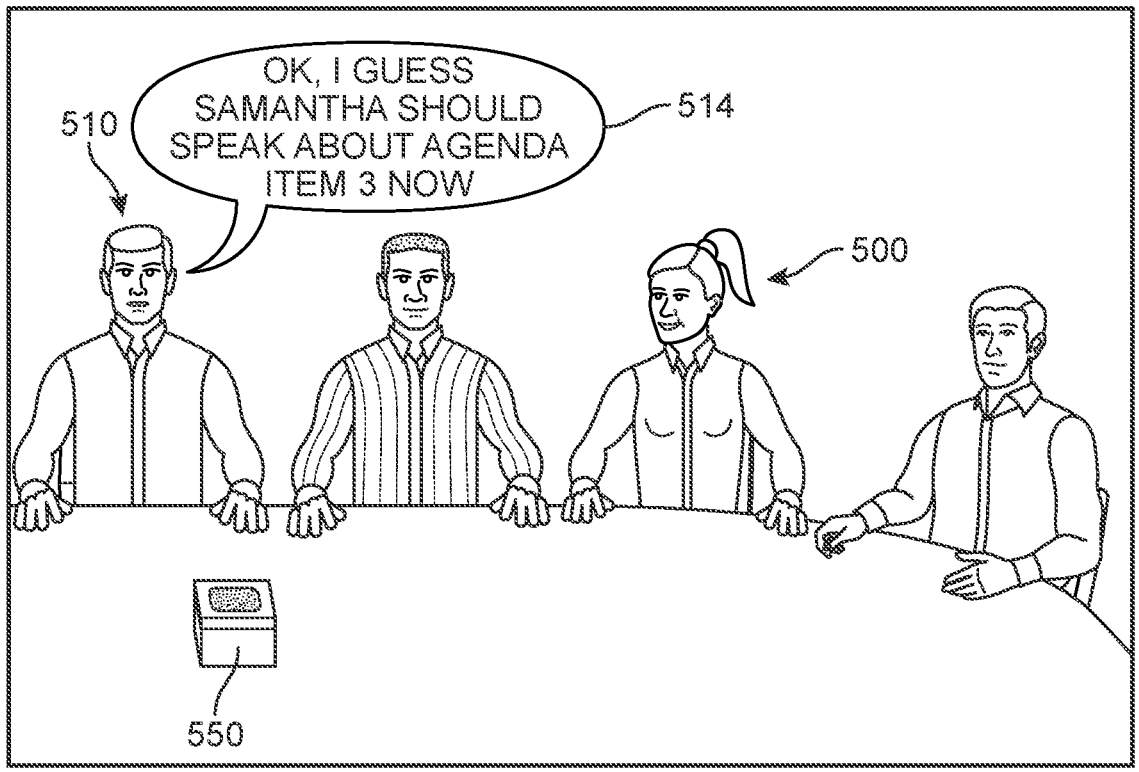

A second example is shown in FIGS. 5A and 5B, where a group 500 comprising several persons are seated around a table conducting a meeting, such as a company or other organizational meeting. A first speaker 510 is standing and raising his voice and/or becoming more animated while expressing a first statement 512 ("And another thing! Whenever I receive one of those long reports -"). A first SFA-equipped computing device 550, represented here as running on a generic computing device such as a smart device, detects the first speaker's emotional state as well as the fact that this topic is not related to their described agenda that was recited or otherwise inputted to the SFA before or at the start of the meeting. In response to one or either of these triggering events, the first SFA 500 presents interrupting content comprising of first audio response 552 ("Perhaps this is a concern that is better discussed at a later time") that can gently guide the group back to their intended discussion. For example, in FIG. 5B, first speaker 510 has returned to his seat, and more thoughtfully moves the conversation away from himself in a second statement 514 ("Ok, I guess Samantha should speak about Agenda Item 3 now").

Figure 6:
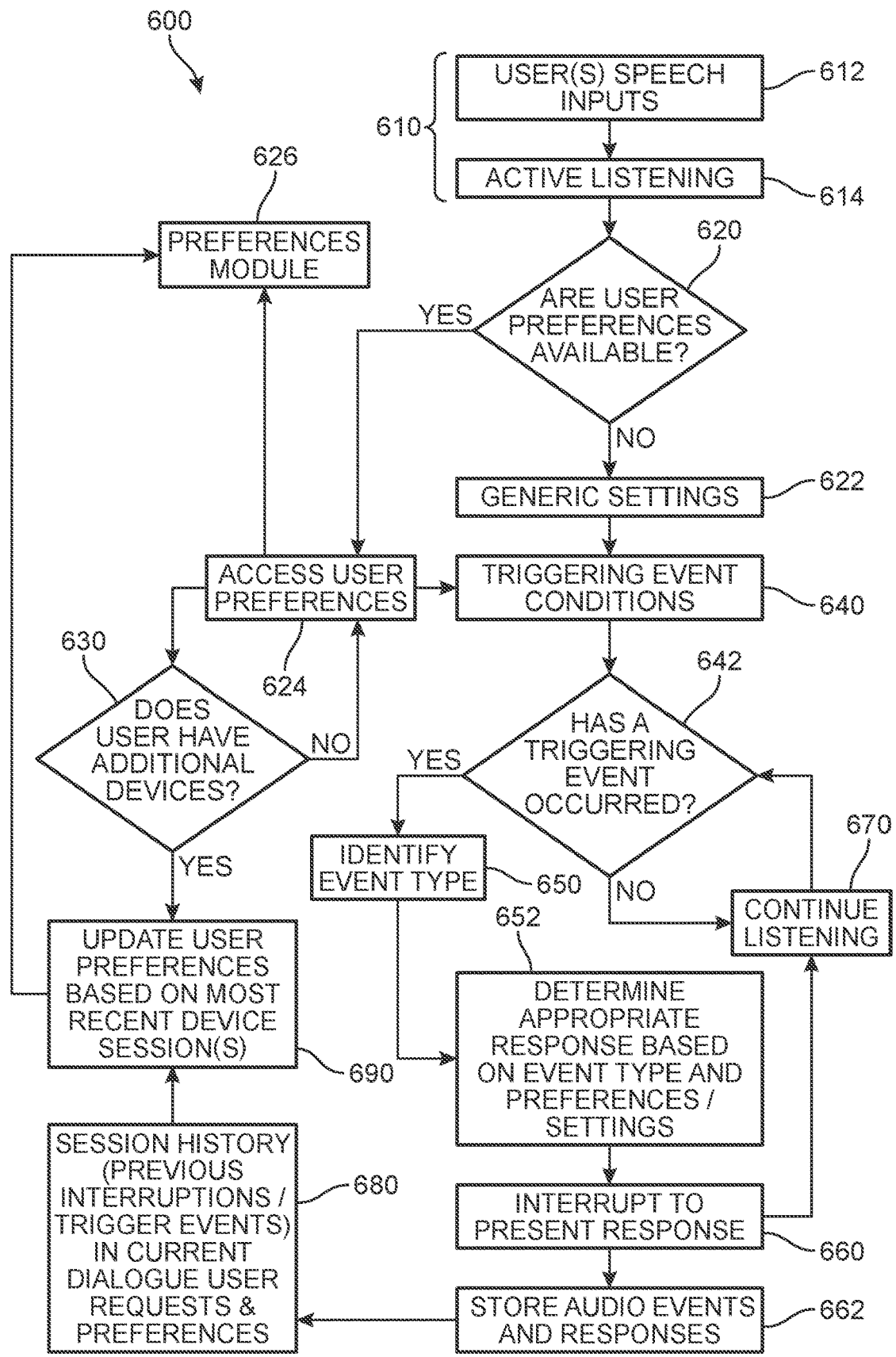
FIG. 6 is a flow diagram showing one example of a process for determining whether a user should be interrupted, according to an embodiment.

For purposes of clarity, a flow diagram 600 of one embodiment of a process of presenting interrupting content is shown in FIG. 6. In this example, in a first stage 610, user speech inputs 612 are received by the SFA which is configured to actively listen 614 to the user during specific tasks. In a second stage 620, the system determines whether any user preferences pertinent to the current task are available for this user. If preferences are available, the system accesses these user preferences in a third stage 624, for example, via a preferences module 626. Optionally, additional user devices for the current user may be detected in a fourth stage 630. If there are additional devices, the system may optionally ensure that the most recent settings and/or user activity has been received in order to update the preferences module 626 in a fifth stage 690. If there are no additional devices, the flow moves to a seventh stage 642 in which the speech inputs are reviewed for indications of triggering event conditions, based instructions from either a default configuration mode or user configured settings 640. If the model determines a triggering event has occurred, the event type may optionally be identified in an eighth stage 650. This information may be used in a ninth stage 652, whereby the system determines an appropriate response that will be generated as content for the imminent interruption. Once the response is created, the system presents the interrupting content in a tenth stage 660. The system then continues listening in an eleventh stage 670. In some embodiments, the user interaction history and feedback can be stored for use or reference by the system in an eleventh stage 662 as session history 680, which may also be shared in subsequent sessions for use by other devices.

Figure 7A:
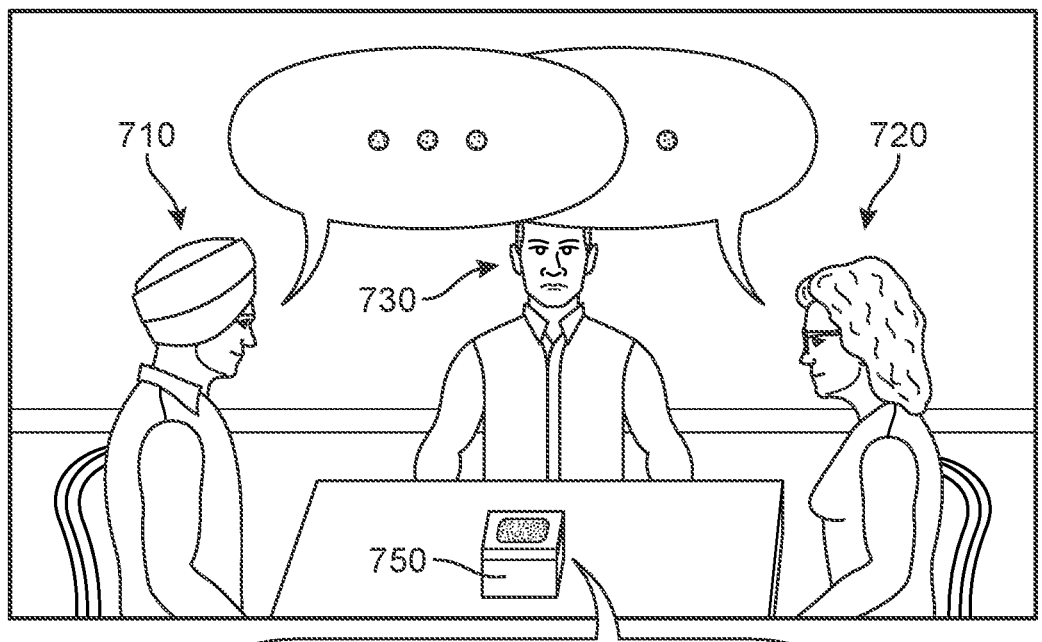
FIGS. 7A and 7B present an example of a smart feedback assistant interrupting a conversation in which two persons are speaking over one another to provide moderation during the conversation, according to an embodiment.
Figure 7B:
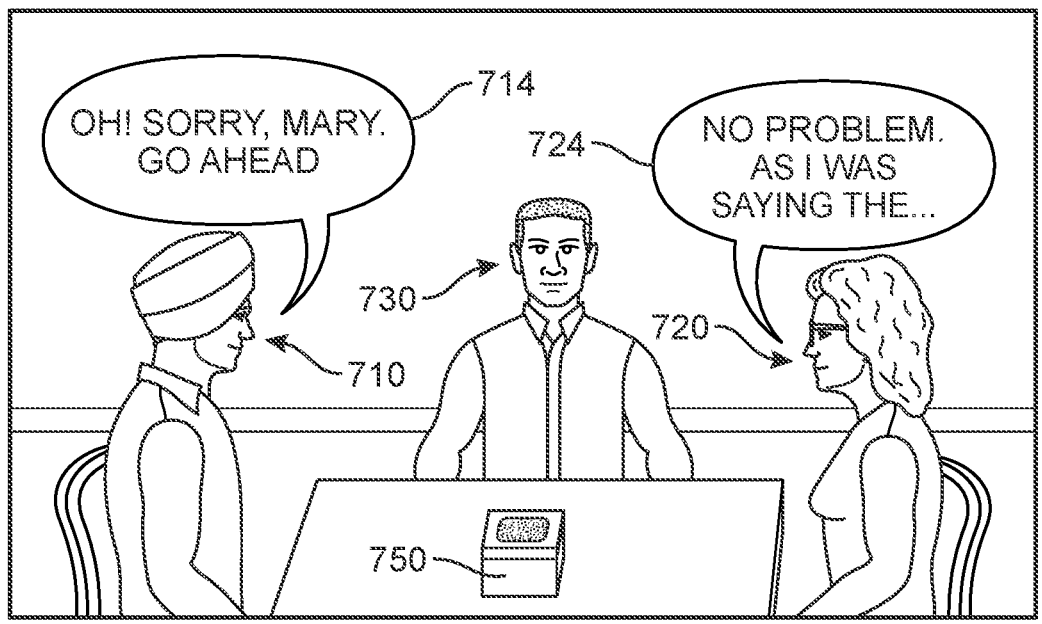

For purposes of illustration, several additional examples of some of the proposed embodiments are now depicted in FIGS. 7A-11C. A third example is presented in FIGS. 7A and 7B, which includes a small group seated in a coffee shop 700 having a conversation. In FIG. 7A, a first participant 710 can be understood to be speaking over the speech of a second participant 720 while a third participant 730 is seated between them, unsure of how to improve the discussion but aware that the discussion is ineffective at this time. Upon determining a triggering event has occurred (in this case, two people speaking over one another), a second SFA-equipped computing device 750 generates interrupting content 752 at a higher volume than the two speakers in order to be heard: "Perhaps Mary wanted to complete her idea before others chime in. Mary?" In FIG. 7B, first participant 710 responds with apologetic statement 714 ("Oh sorry Mary, go ahead") while second participant 720 (Mary) continues with her point 724 ("No problem. As I was saying, the . . . "). Thus, rather than impose the burden of moderating on the third participant 730, an objective impersonal source can provide moderating guidance or feedback, resulting in less animosity from the first participant 720 at the correction because of the absence of a human face behind the feedback, as well as easing frustration felt by second participant 720, and bringing relief from the third participant 730 when he or she was not required to 'take sides'.

Figure 8A:
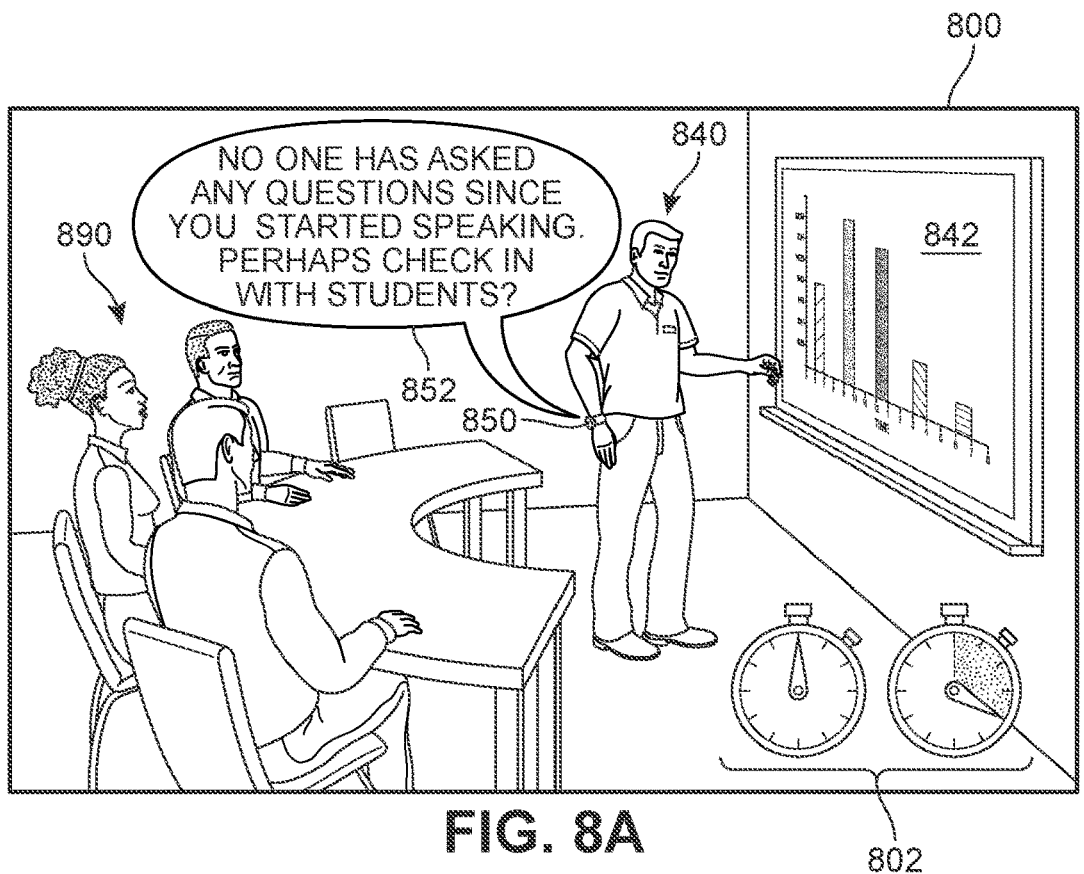
FIGS. 8A and 8B present an example of a smart feedback assistant presenting a private interrupting message to a speaker, according to an embodiment.
Figure 8B:
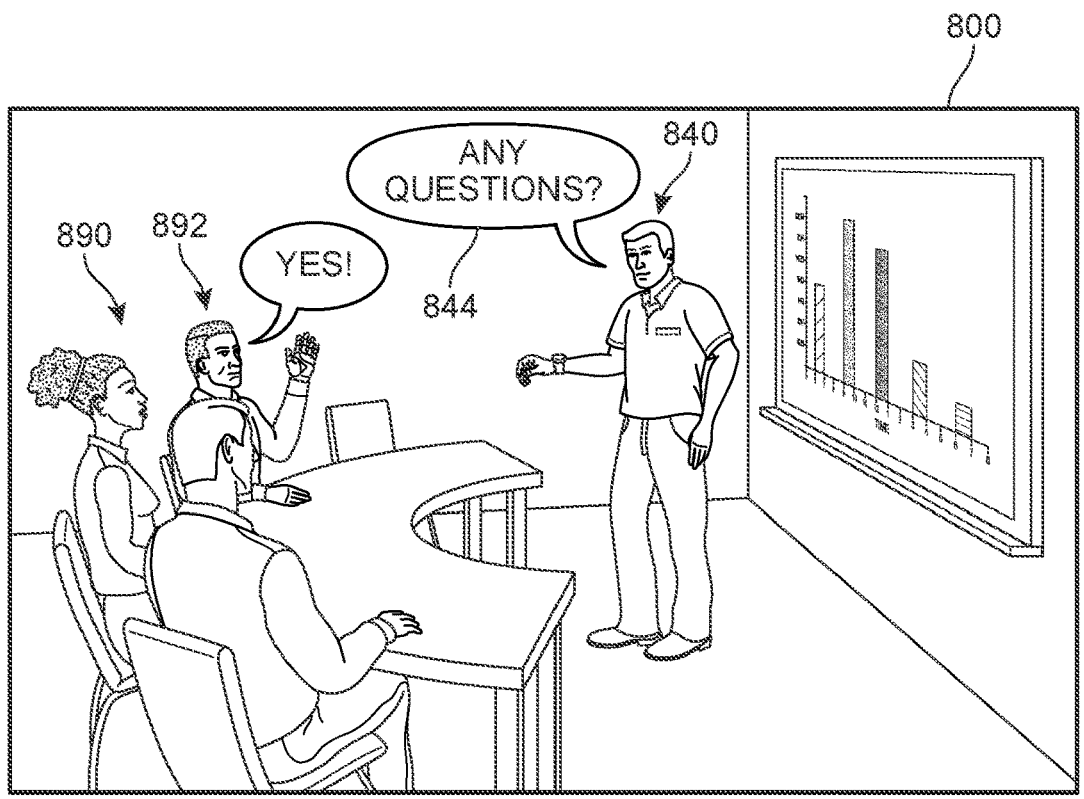

A fourth example in a classroom setting 800 is shown in FIGS. 8A and 8B. A group of students 890 are shown listening to a lecture 842 being provided by a teacher 840 standing in the front of the room. The teacher 840 continues his lecture without pause for a duration that exceeds the duration he had established in his SFA preferences as being too long, in order to train himself to take more breaks and check in with his students. In response to this user-requested triggering event, the selected response type is presented less obtrusively as a message 852 ("No one has asked any questions since you started speaking. Perhaps check in with the students?") shown on a third SFA-equipped computing device 850 (in this case, his smartwatch display) by an SFA running therein. In some embodiments, the message 852 can be accompanied by an unobtrusive audio cue such as a beep or vibration to alert the teacher 840 that interrupting content is being displayed. Upon noticing this relatively subtle interrupting content, the teacher 840 is able to remember the need to pause in his lecture, and ask if there are any questions 844, to which a first student 892 immediately raises his hand.

Thus, in this case, the teacher 840 is able to help himself to help his students better by having the SFA monitor the duration of his speech and detect whether there have sufficient been pauses or breaks. This allows the students to participate more as they do not feel that they have interrupted their teacher. In some other embodiments, the app may provide options that enable the user to identify a grade-level or other standard comprehension level for his/her audience, and request that the SFA interrupt if he or she exceeds that level of speech, in order to check in with the students or to re-set the language level to the appropriate level. In another example, the app can provide options that enable the user to select a speaking speed, and request that the SFA interrupt if he or she speaks at a rate faster than the selected speed. In some embodiments, the app may provide options that enable the user to request an interruption if one or more listeners have not spoken for a selected period of time. In one embodiment, the user may be able to select a specific listener from whom a period of no speech can cause an interruption to help the speaker ensure that the selected listener is following the lecture or dialogue (e.g., the selected listener has had trouble previously or indicated the subject matter is difficult for him/her).

Figure 9A:
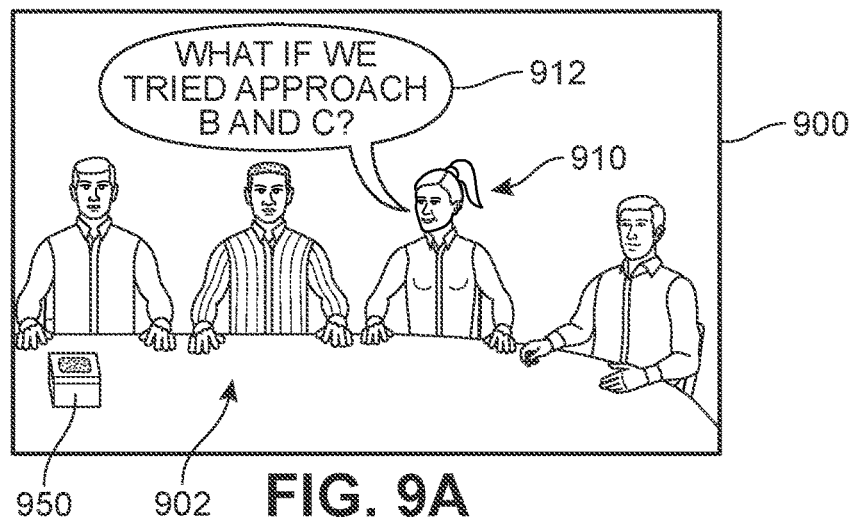
FIGS. 9A-9C present an example of a smart feedback assistant interrupting a discussion to clarify a source of a topic, according to an embodiment.
Figure 9B:
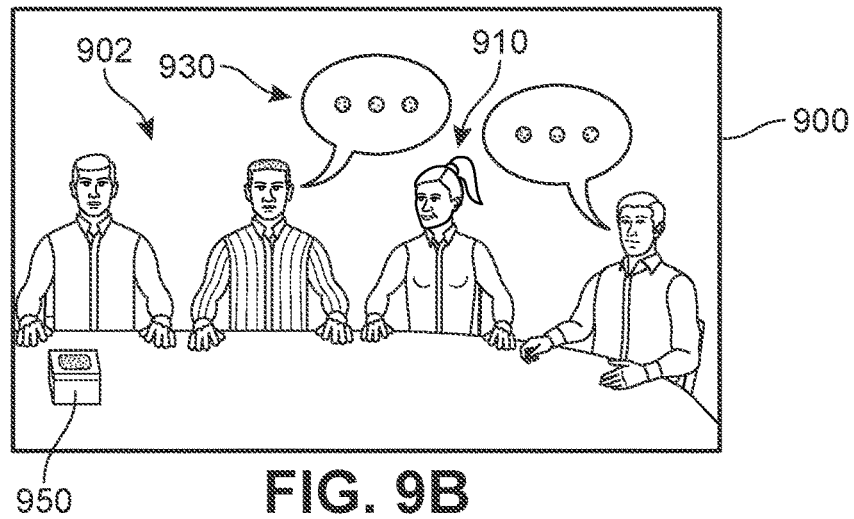
Figure 9C:
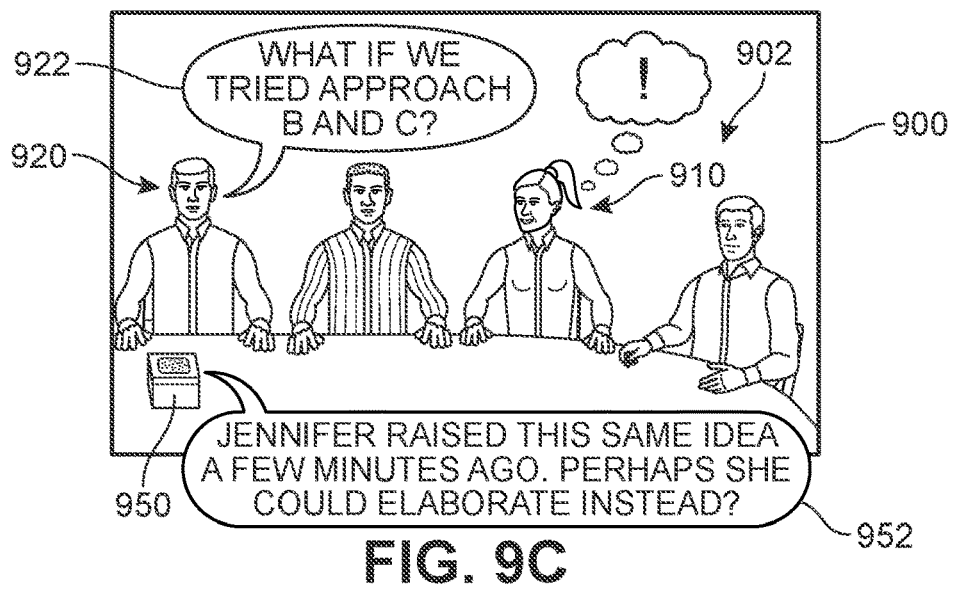

A fifth example is shown in FIGS. 9A-9C, in which a business meeting 900 is occurring with several attendees 902 while a fourth SFA-equipped computing device 950 in the room actively listens to the speech content generated by the attendees 902. In FIG. 9A, a first attendee 910 raises an idea 912 ("What if we tried Approach B and C?") but does not receive any indication that others were listening, as shown in FIG. 9B, where the attendees 902 continue to speak to one another without acknowledging the first attendee's words. In FIG. 9C, a second attendee 920 interjects by raising his voice and repeating "What if we tried Approach B and C?" 922 while the first attendee 910 appears frustrated. Frequently in such scenarios, particularly where the original speaker has a lower or less senior role in the organization or is otherwise overlooked, and/or where the second attendee 920 is more outspoken or overbearing, the idea would be acknowledged as having been proposed by the second attendee 920, while the first attendee 910 sits silently, unable to correct the situation. However, as shown in FIG. 9C, the SFA is able to determine that a triggering event has occurred—in this case, where an idea and/or content has been previously raised, as an observation 952 ("Jennifer raised this same idea a few minutes ago. Perhaps she could elaborate instead?") thereby neutrally bringing the conversation back onto a more equal footing, and one where attendees who normally are not noticed can be acknowledged.

A sixth example is depicted with reference to FIGS. 10A-10D. In a first case, shown in FIGS. 10A and 10B, a different meeting 1000 is occurring with several group members, while a fifth SFA-equipped computing device 1050 in the room actively listens to the speech content generated by the members. A first member 1010 makes a first report 1012 ("I heard the Dow Jones fell by 888 points yesterday"), to which a second member 1020 (who may be the head of the group) makes a first response 1022 ("So maybe we should hold -") that is interrupted once a false content triggering event is identified by the SFA, causing the SFA to interrupt with a corrective statement 1052 ("Looking at today's news, it actually only fell by 88 points"). In this case, the meeting proceeds with the correct information, such that second member 1020 adds a second response 1024 ("Oh, OK, so we can proceed"), underlining the benefits of a misinformation detection smart device 'participating' in the meeting. However, it can be appreciated that first member 1010 may feel chastened, or otherwise embarrassed.

Figure 10A:
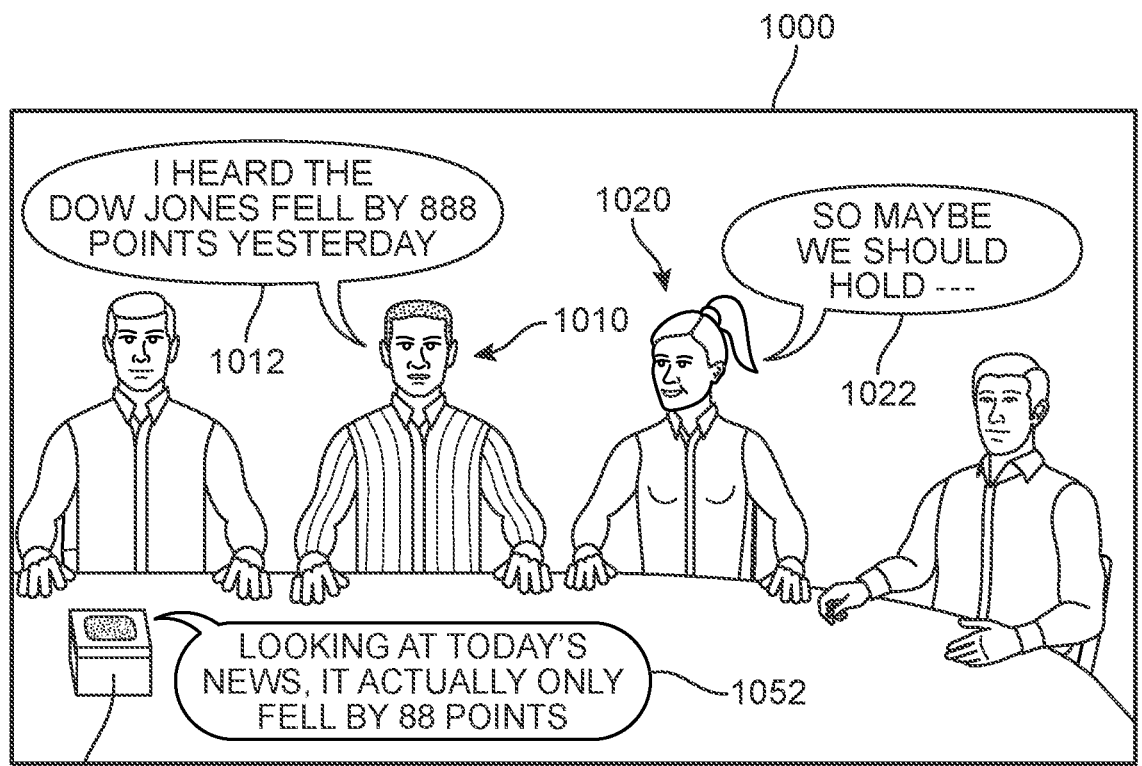
FIGS. 10A and 10B present an example of a smart feedback assistant interrupting a discussion based on the content of the speech, according to an embodiment.
Figure 10B:
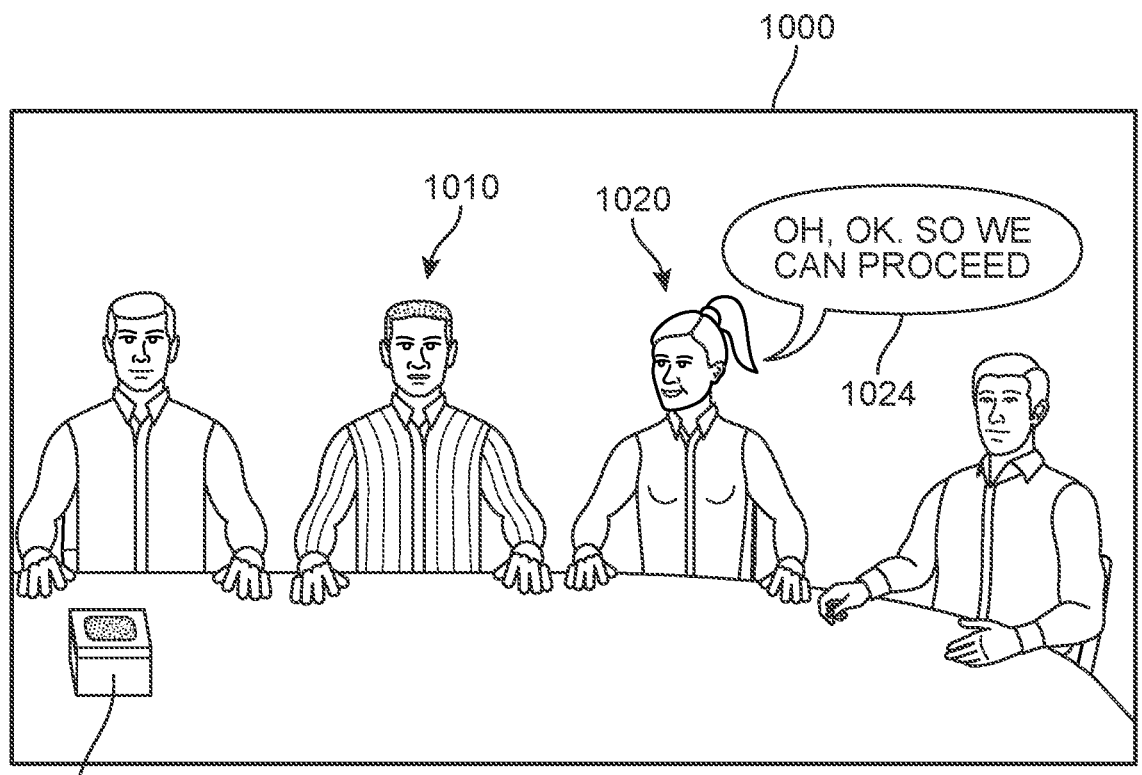
Figure 10C:
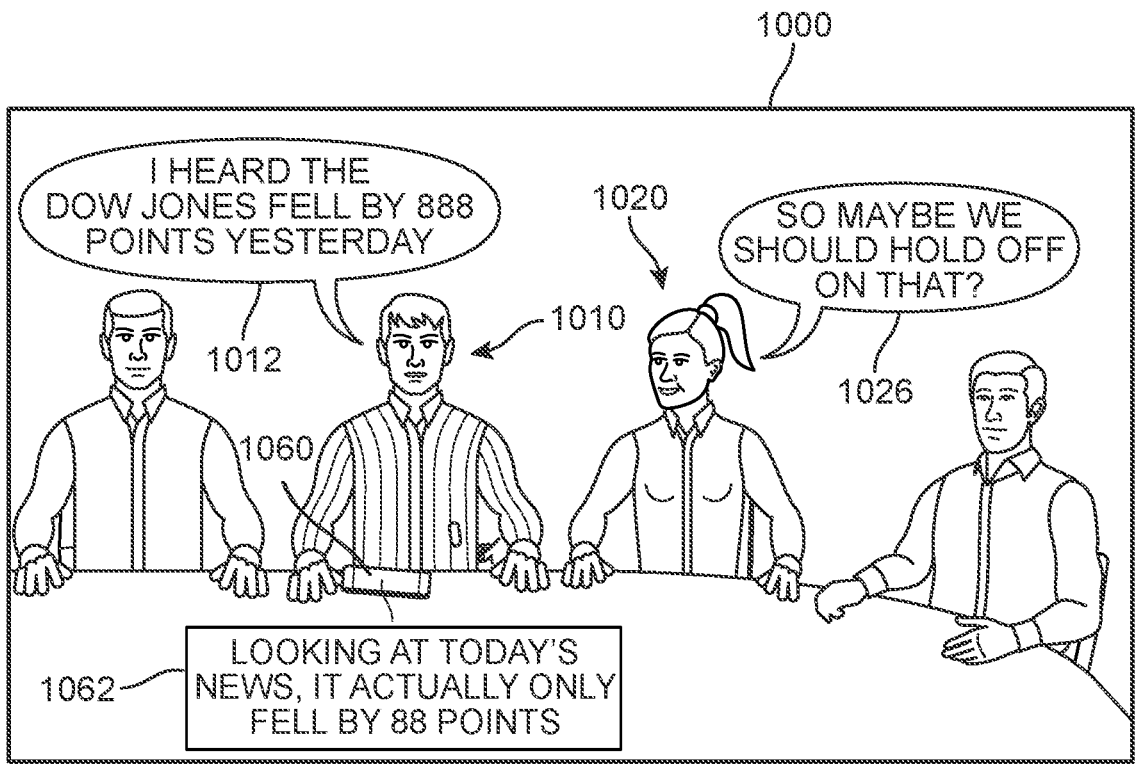
FIGS. 10C and 10D present an example of a smart feedback assistant presenting a private interrupting message based on the content of the speech, according to an embodiment.
Figure 10D:
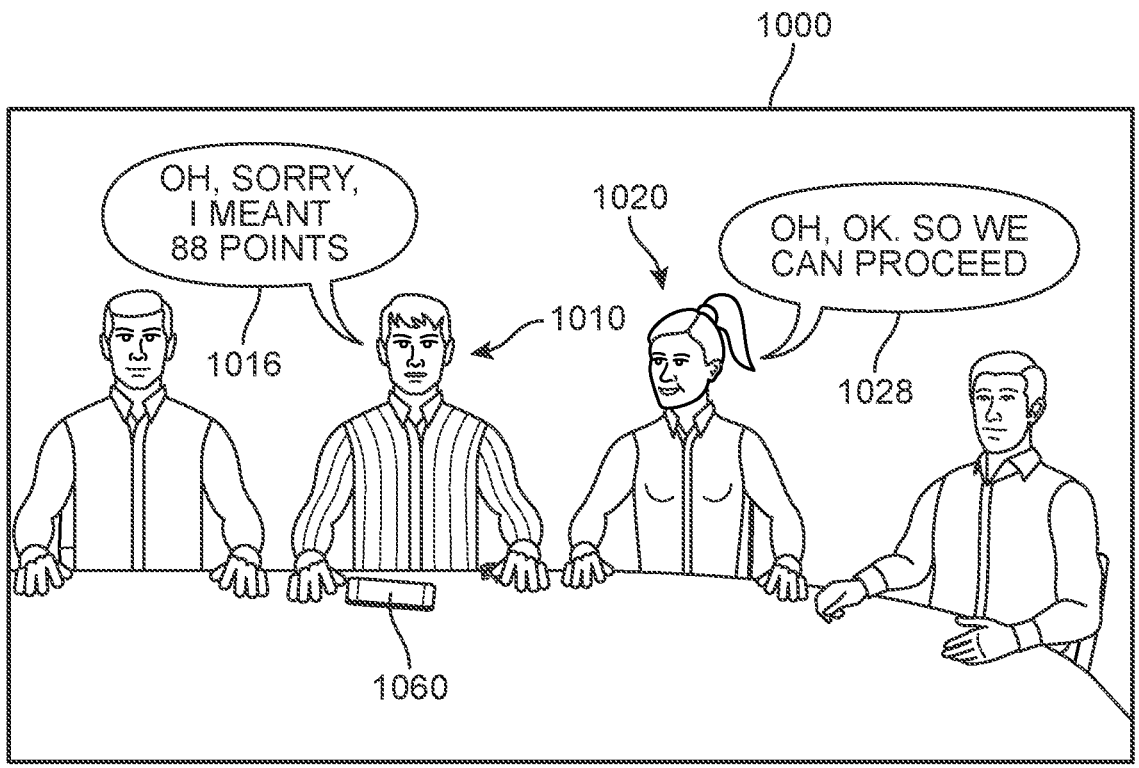

In an alternate embodiment, depicted in FIGS. 10C and 10D, a similar scenario is unfolding as the first member 1010 makes the same report 1012 ("I heard the Dow Jones fell by 888 points yesterday"), to which the second member 1020 makes a third response 1026 ("So maybe we should hold off on that?"). In this case, the first member 1010 has made a report that includes false information, which may not be realized until much later when further decisions have been made. However, a sixth-SFA equipped computing device 1060 in the form of a personal tablet is running and actively listening to the meeting. In contrast to the previous situation, when the SFA interrupted the members to produce an audio-based correction, the SFA in this case is configured by first member 1010 to present the correction as a display-based text correction 1062 ("Looking at today's news, it actually only fell by 88 points"), thereby only passively interrupting the first member 1010 as he looks at his tablet. The first member 1010 is then able to volunteer a corrected statement 1016 himself, appearing to have simply misspoken, reducing the impact of the mistake on both the group and on himself, allowing the meeting to proceed with the updated information at that time.

Figure 11A:
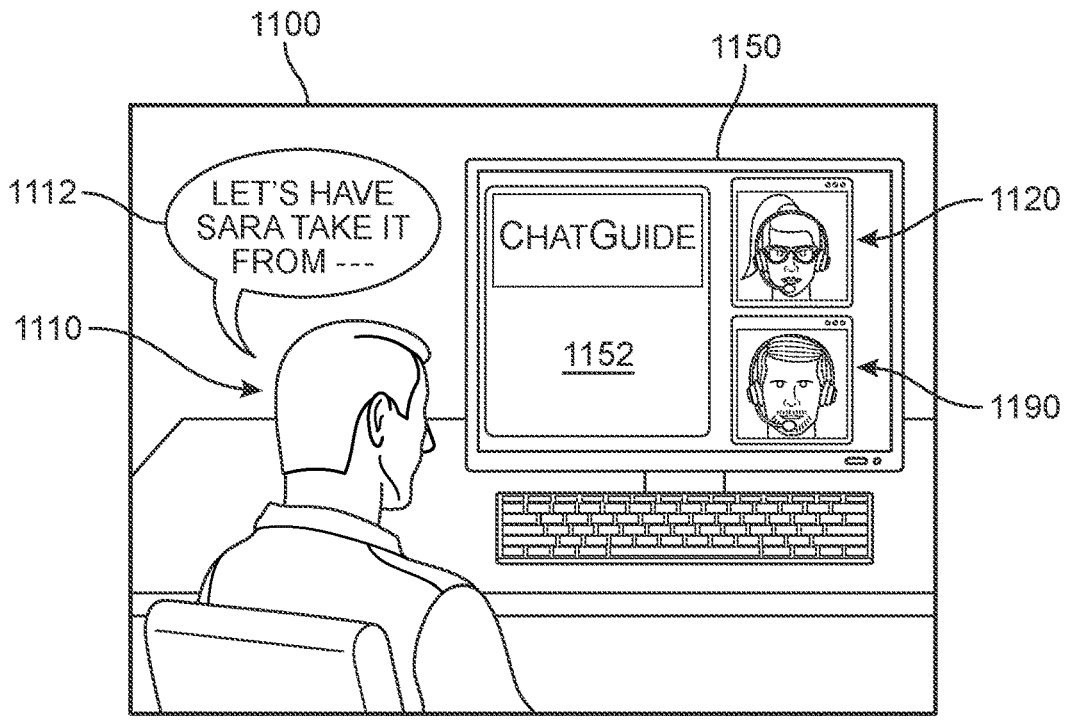
FIGS. 11A-11C present an example of a smart feedback assistant presenting a private interrupting message based on a name mispronunciation, according to an embodiment.
Figure 11B:
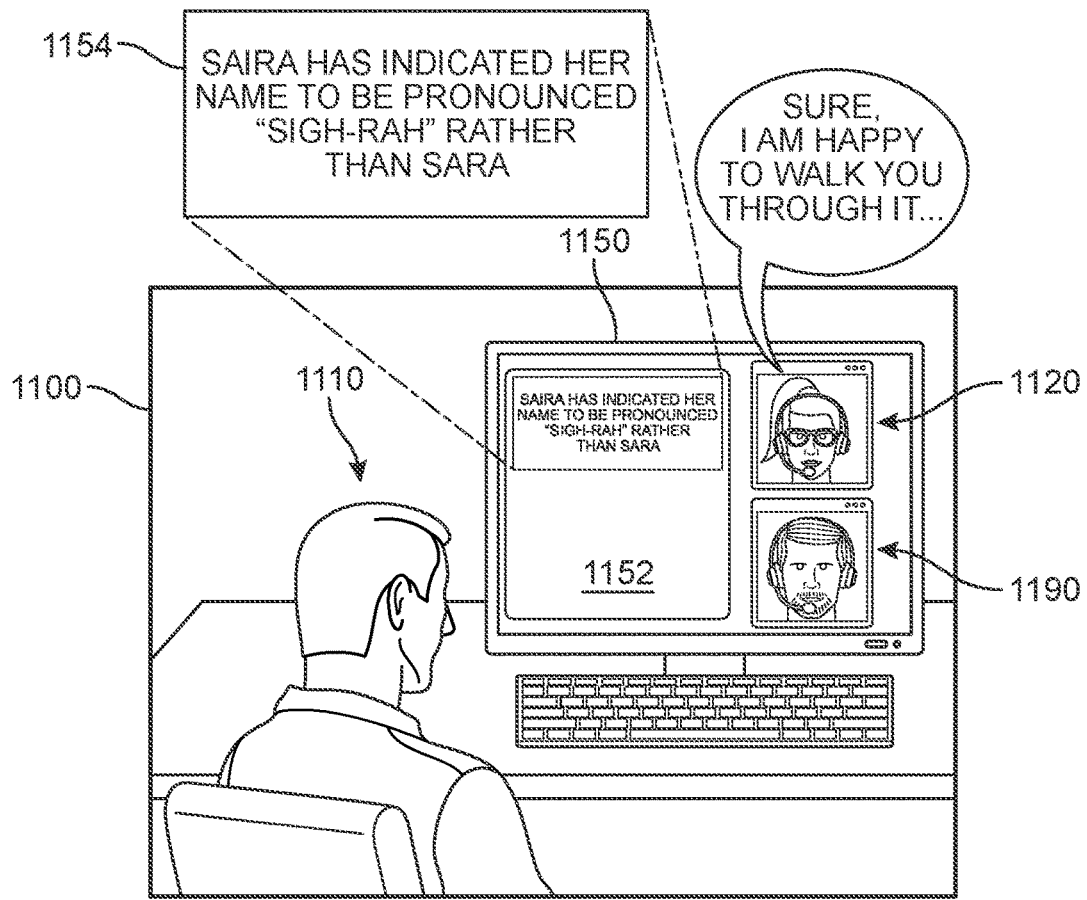
Figure 11C:
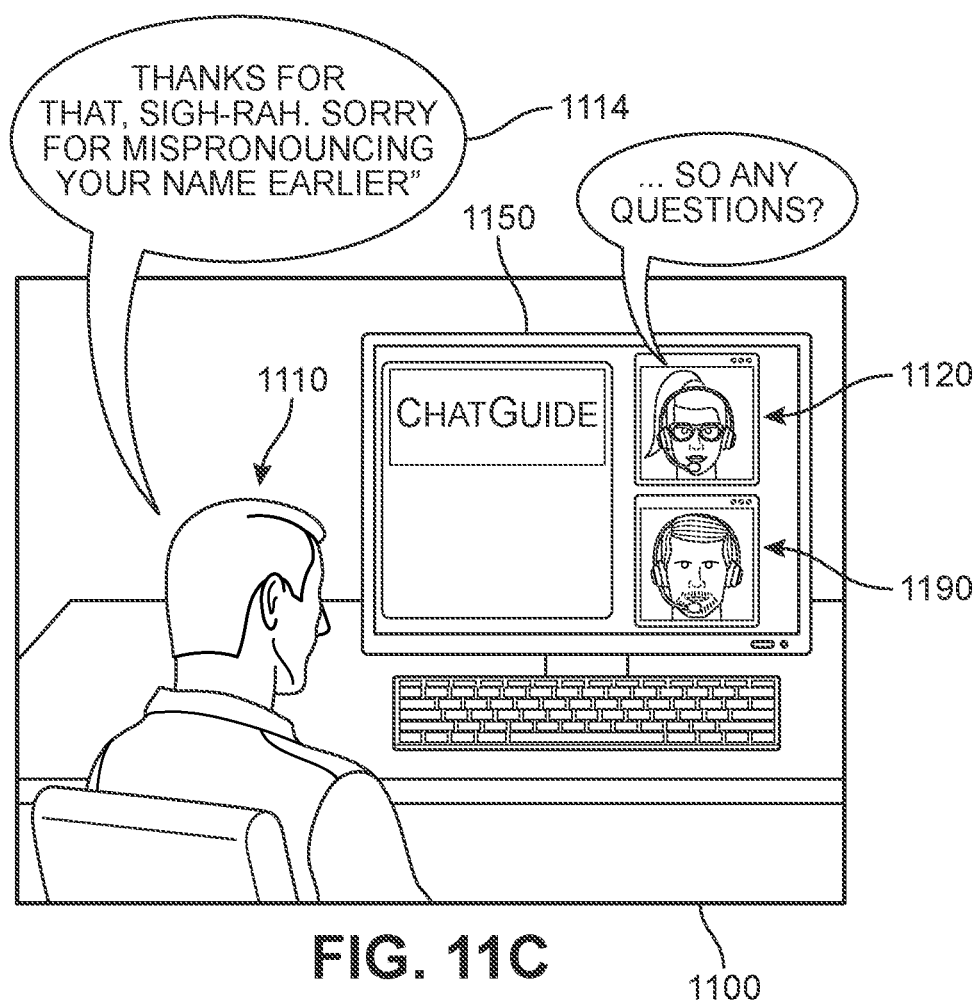

An eighth example is shown with reference to FIGS. 11A-11C, where a virtual conference call 1100 is occurring. A meeting leader 1100 is shown seated at a seventh SFA-equipped computing device 1150 while interacting with participants 1190 via video shown on the device display. In this case, the SFA is configured to interact with the meeting leader 1110 as a chatbot interface 1152 on which messages can be shown. In FIG. 11A, the meeting leader 1110 makes a first request 1112 ("Let's have Sara take it from here"), to direct a first caller 1120 to begin speaking. However, as shown in FIG. 11B, the SFA has access to one or more of the caller's preference modules, and based on that data is able to detect a mispronunciation of the first caller's name, which in this embodiment (based on the meeting leader's settings) corresponds to a triggering event. In response, the SFA causes the chatbot interface 1152 to present a corrective message 1154 ("Saira has indicated her name is to be pronounced "Sigh-rah" rather than Sara"). This information appears while Saira is speaking, and can be understood to have only interrupted meeting leader 1110. In FIG. 11C, the meeting leader 1110 offers an apology 1114 ("Thanks for that, Sigh-rah. Sorry for mispronouncing your name earlier") once first caller 1120 has finished speaking, thereby restoring the confidence in the first caller's sense of inclusion and individuality without requiring her to correct her supervisor.

Figure 12:
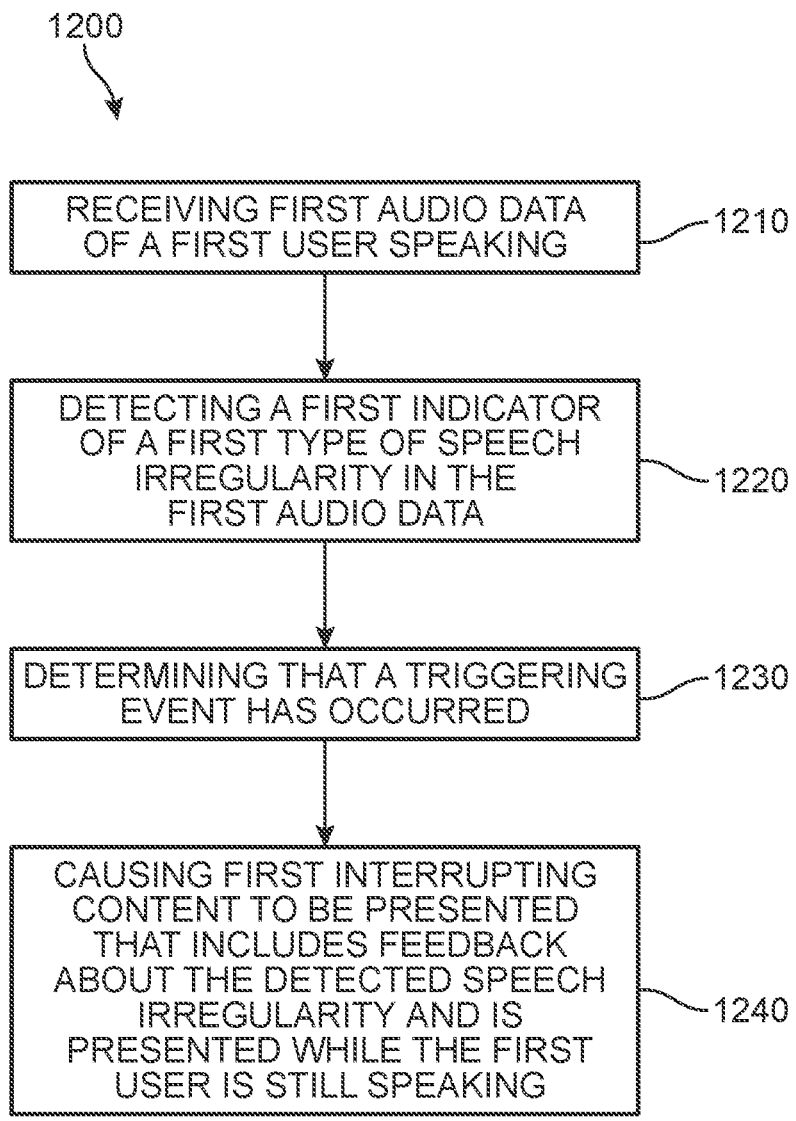
FIG. 12 is a flow diagram of a process of computer-implemented method for providing real-time feedback during speech-based interactions, according to an embodiment.

FIG. 12 is a flow chart illustrating an embodiment of a computer-implemented method 1200 of presenting interrupting content during speech. The method includes a first step 1210 of receiving, at a first time and by an application accessed through a computing device, first audio data of a first user speaking, and a second step 1220 of detecting, via the application, at least a first indicator of a first type of speech irregularity in the first audio data. A third step 1230 includes determining, by the application and based on the first indicator, that a triggering event has occurred. The method 1200 further includes a fourth step 1240 of causing, via the application, first interrupting content to be presented, where the first interrupting content includes feedback about the detected speech irregularity, and is presented at a second time regardless of whether the first user is still speaking.

In other embodiments, the method may include additional steps or aspects. In one embodiment, the first type of speech irregularity is one of a mispronunciation, lexico-grammatical inaccuracy, prosodic error, semantic error, speech disfluency, and incorrect phraseology. In some embodiments, the method also includes steps of receiving, via the application, second audio data of the first user speaking, detecting, by the application, a second indicator of a content irregularity in the second audio data, and causing, via the application, second interrupting content to be presented that includes feedback identifying misinformation identified in the second audio data. In such cases, the second interrupting content can also include feedback correcting the misinformation.

In some embodiments, the feedback includes guidance about correcting the detected speech irregularity. In another example, the first interrupting content is presented as audio output that interrupts the first user while the first user is speaking. In some other examples, the first interrupting content is presented as visual output that interrupts a second user while the first user is speaking. In one embodiment, the second time is less than ten seconds after the first time.

Other methods can also be contemplated within the scope of this disclosure. For example, a computer-implemented method of presenting interrupting content during a conversation including at least a first participant and a second participant is disclosed. The method includes a first step of receiving at a first time and by an application accessed via a computing device, first audio data of at least the first participant speaking, and a second step of detecting, by the application, a first indicator of a first type of conversational irregularity in the first audio data. The method also includes a third step of determining, by the application and based on the first indicator, that a triggering event has occurred, and a fourth step of causing, via the application, first interrupting content to be presented. In addition, the first interrupting content includes moderating guidance associated with the detected conversational irregularity, and is presented at a second time while one or both of the first participant and second participant are speaking.

In other embodiments, the method may include additional steps or aspects. In some embodiments, the first type of conversational irregularity is one of an instance in which the first participant cut off the second participant mid-speech, the first participant and second participant are speaking over one another, the first participant is raising their voice, and the first participant is repeating what the second participant said earlier in the conversation. In one embodiment, the moderating guidance includes a suggestion that the second participant be allowed to continue speaking. In another embodiment, the moderating guidance includes a recognition that the second participant previously raised an idea that is now being raised in first audio data. In some embodiments, the method also includes a step of receiving, by the application and prior to the first time, a first input describing an agenda for the conversation, and the moderating guidance includes a reminder that content in the first audio data is off-topic with respect to the agenda. In yet another example, the method can further include steps of receiving, prior to the first time and via the application, a first data input corresponding to a selection of a duration, storing the first data input in a preferences module for the first participant, determining, by the application, the first audio data includes substantially continuous speech made by the first participant that exceeds the selected duration, and causing, via the application, second interrupting content to be presented, wherein the second interrupting content includes a notification that the first user has exceeded the selected duration.

In some other embodiments, additional features or aspects may be implemented. For example, a computer-implemented method of providing interactive speech guidance content, conversational input, dialogue, chat, or other interactions is disclosed. The method includes obtaining a first sample of speech uttered by a first person, and obtaining a first transcription of the first sample. In addition, the method includes a second step of training a first machine learning model using the first sample and the first transcription to recognize speech characteristics for the first person. The method includes a third step of receiving a first stream of speech in real-time or near real-time as it is uttered by a second person (i.e., active listening), and determining, via the machine learning model, that a first irregularity of speech occurred in the first stream. A fourth step includes interrupting nearly immediately, via a virtual assistant, the first stream of speech in order to notify the second person of the first irregularity.

Other methods can also be contemplated within the scope of this disclosure. For example, a computer-implemented method of determining whether a speech irregularity has occurred is disclosed. The method includes a first step of receiving, at a first time and by an application accessed via a computing device, first audio data of a first user speaking, and a second step of classifying, via a speech-based machine learning model for the application, one or more speech characteristics associated with the first user based on the first audio data. In addition, a third step includes receiving, at a second time and by the application, second audio data of the first user speaking, and a fourth step of determining, via the application, that a speech irregularity has occurred in the second audio data, the determination based at least in part by a comparison of the second audio data with the classified speech characteristics. Furthermore, the method includes a fifth step of causing, via the application, first interrupting content to be presented by the computing device in response to the determination that a speech irregularity has occurred. In such cases, the first interrupting content includes feedback about the detected speech irregularity, and is presented at a subsequent third time regardless of whether the first user is still speaking.

In other embodiments, the method may include additional steps or aspects. In some embodiments, the speech-based machine learning model resides on a first computer device associated with the first user. In another embodiment, the method also includes a step of generating, based on the classified speech characteristics, a user profile for the first user, the user profile including (at least) an identification of a language and an accent of the first user (e.g., see FIG. 2A). Other speech characteristics can include audio features and patterns detected in the audio data as described above with respect to region, age, likely gender, use of pronouns, likely ethnicity and/or cultural heritage, etc. in some embodiments, the method can further include steps of receiving from the first user, at a third time and by the application, a first selection of a first type of speech irregularity that should elicit presentation of interrupting content from the application, storing, by the application, the first selection in the user profile, and referring to the user profile when determining whether a speech irregularity has occurred. In another example, the method can additionally include steps of receiving from the first user, at a third time and by the application, a first selection of a first type of speech irregularity that should be excluded from triggering a presentation of interrupting content from the application, storing, by the application, the first selection in the user profile, and referring to the user profile when determining whether a speech irregularity has occurred.

Thus, as described herein, the disclosed embodiments can provide valuable insights to speakers about their speech, and provide personalized and customizable feedback. It is well-documented that accurate and timely feedback is essential to help language learners notice discrepancies between their language production and the target language. In addition, interrupting content increases the sense of a meaningful, authentic interaction with the smart assistant computers.

Images generated applying one or more of the techniques disclosed herein may be displayed on a monitor or other display device. In some embodiments, the display device may be coupled directly to the system or processor generating or rendering the images. In other embodiments, the display device may be coupled indirectly to the system or processor such as via a network. Examples of such networks include the Internet, mobile telecommunications networks, a WIFI network, as well as any other wired and/or wireless networking system. When the display device is indirectly coupled, the images generated by the system or processor may be streamed over the network to the display device. Such streaming allows, for example, video games or other applications, which render images, to be executed on a server or in a data center and the rendered images to be transmitted and displayed on one or more user devices (such as a computer, video game console, smartphone, other mobile device, etc.) that are physically separate from the server or data center. Hence, the techniques disclosed herein can be applied to enhance the images that are streamed and to enhance services that stream images such as NVIDIA® GeForce Now (GFN), Google® Stadia, and the like.

In addition, sound or other audio generated applying one or more of the techniques disclosed herein may be produced by a speaker or other audio output device. In some embodiments, the audio device may be coupled directly to the system or processor generating the sound. In other embodiments, the audio device may be coupled indirectly to the system or processor such as via a network. Examples of such networks include the Internet, mobile telecommunications networks, a WIFI network, as well as any other wired and/or wireless networking system. When the audio device is indirectly coupled, the sound generated by the system or processor may be streamed over the network to the display device. Such streaming allows applications and other software which include audio to be executed on a server or in a data center and the generated sound to be transmitted and produced by one or more user devices (such as a computer, smartwatch, smartphone, other mobile device, etc.) that are physically separate from the server or data center. Hence, the techniques disclosed herein can be applied to enhance the sounds that are streamed and to enhance services that provide audio.

The processes and methods of the embodiments described in this detailed description and shown in the figures can be implemented using any kind of computing system having one or more central processing units (CPUs) and/or graphics processing units (GPUs). The processes and methods of the embodiments could also be implemented using special purpose circuitry such as an application specific integrated circuit (ASIC). The processes and methods of the embodiments may also be implemented on computing systems including read only memory (ROM) and/or random access memory (RAM), which may be connected to one or more processing units. Examples of computing systems and devices include, but are not limited to: servers, cellular phones, smart phones, tablet computers, notebook computers, smart watches, smart glasses, e-book readers, laptop or desktop computers, all-in-one computers, as well as various kinds of digital media players.

The processes and methods of the embodiments can be stored as instructions and/or data on non-transitory computer-readable media. The non-transitory computer readable medium may include any suitable computer readable medium, such as a memory, such as RAM, ROM, flash memory, or any other type of memory known in the art. In some embodiments, the non-transitory computer readable medium may include, for example, an electronic storage device, a magnetic storage device, an optical storage device, an electromagnetic storage device, a semiconductor storage device, or any suitable combination of such devices. More specific examples of the non-transitory computer readable medium may include a portable computer diskette, a floppy disk, a hard disk, magnetic disks or tapes, a read-only memory (ROM), a random access memory (RAM), a static random access memory (SRAM), a portable compact disc read-only memory (CD-ROM), an erasable programmable read-only memory (EPROM or Flash memory), electrically erasable programmable read-only memories (EEPROM), a digital versatile disk (DVD and DVD-ROM), a memory stick, other kinds of solid state drives, and any suitable combination of these exemplary media. A non-transitory computer readable medium, as used herein, is not to be construed as being transitory signals, such as radio waves or other freely propagating electromagnetic waves, electromagnetic waves propagating through a waveguide or other transmission media (e.g., light pulses passing through a fiber-optic cable), or electrical signals transmitted through a wire.

Instructions stored on the non-transitory computer readable medium for carrying out operations of the present invention may be instruction-set-architecture (ISA) instructions, assembler instructions, machine instructions, machine dependent instructions, microcode, firmware instructions, configuration data for integrated circuitry, state-setting data, or source code or object code written in any of one or more programming languages, including an object oriented programming language such as Smalltalk, C++, or suitable language, and procedural programming languages, such as the "C" programming language or similar programming languages.

Aspects of the present disclosure are described in association with figures illustrating flowcharts and/or block diagrams of methods, apparatus (systems), and computing products. It will be understood that each block of the flowcharts and/or block diagrams can be implemented by computer readable instructions. The flowcharts and block diagrams in the figures illustrate the architecture, functionality, and operation of possible implementations of various disclosed embodiments. Accordingly, each block in the flowchart or block diagrams may represent a module, segment, or portion of instructions. In some implementations, the functions set forth in the figures and claims may occur in an alternative order than listed and/or illustrated.

The embodiments may utilize any kind of network for communication between separate computing systems. A network can comprise any combination of local area networks (LANs) and/or wide area networks (WANs), using both wired and wireless communication systems. A network may use various known communications technologies and/or protocols. Communication technologies can include, but are not limited to: Ethernet, 802.11, worldwide interoperability for microwave access (WiMAX), mobile broadband (such as CDMA, and LTE), digital subscriber line (DSL), cable internet access, satellite broadband, wireless ISP, fiber optic internet, as well as other wired and wireless technologies. Networking protocols used on a network may include transmission control protocol/Internet protocol (TCP/IP), multiprotocol label switching (MPLS), User Datagram Protocol (UDP), hypertext transport protocol (HTTP), hypertext transport protocol secure (HTTPS) and file transfer protocol (FTP) as well as other protocols.

Data exchanged over a network may be represented using technologies and/or formats including hypertext markup language (HTML), extensible markup language (XML), Atom, JavaScript Object Notation (JSON), YAML, as well as other data exchange formats. In addition, information transferred over a network can be encrypted using conventional encryption technologies such as secure sockets layer (SSL), transport layer security (TLS), and Internet Protocol security (Ipsec).

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

While various embodiments are described, the description is intended to be exemplary, rather than limiting, and it will be apparent to those of ordinary skill in the art that many more embodiments and implementations are possible that are within the scope of the embodiments. Although many possible combinations of features are shown in the accompanying figures and discussed in this detailed description, many other combinations of the disclosed features are possible. Any feature or element of any embodiment may be used in combination with or substituted for any other feature or element in any other embodiment unless specifically restricted.

This disclosure includes and contemplates combinations with features and elements known to the average artisan in the art. The embodiments, features, and elements that have been disclosed may also be combined with any conventional features or elements to form a distinct invention as defined by the claims. Any feature or element of any embodiment may also be combined with features or elements from other inventions to form another distinct invention as defined by the claims. Therefore, it will be understood that any of the features shown and/or discussed in the present disclosure may be implemented singularly or in any suitable combination. Accordingly, the embodiments are not to be restricted except in light of the attached claims and their equivalents. Also, various modifications and changes may be made within the scope of the attached claims.

We claim:

1. A computer-implemented method of presenting interrupting content during speech, the method comprising:
    receiving, at a first time and by an application accessed via a computing device, first audio data of a first user speaking;
    detecting, via the application, at least a first indicator of a first type of speech irregularity in the first audio data;
    determining, by the application and based on the first indicator, that a triggering event has occurred; and
    causing, via the application, first interrupting content to be presented by the computing device, wherein the first interrupting content:
        includes feedback about the detected speech irregularity, and
        is presented at a subsequent second time regardless of whether the first user is still speaking.

2. The method of claim 1, wherein the first type of speech irregularity is one of a mispronunciation, lexico-grammatical inaccuracy, prosodic error, semantic error, speech disfluency, and incorrect phraseology.

3. The method of claim 1, further comprising:
    receiving, via the application, second audio data of the first user speaking;
    detecting, by the application, a second indicator of a content irregularity in the second audio data; and
    causing, via the application, second interrupting content to be presented that includes feedback identifying misinformation identified in the second audio data.

4. The method of claim 3, wherein the second interrupting content also includes feedback correcting the misinformation.

5. The method of claim 1, wherein the feedback includes guidance about correcting the detected speech irregularity.

6. The method of claim 1, wherein the first interrupting content is presented as audio output that interrupts the first user while the first user is speaking.

7. The method of claim 1, wherein the first interrupting content is presented as visual output that interrupts a second user while the first user is speaking.

8. The method of claim 1, wherein the second time is less than ten seconds after the first time.

9. A computer-implemented method of presenting interrupting content during a conversation including at least a first participant and a second participant, the method comprising:
    receiving, at a first time and by an application accessed via a computing device, first audio data of at least the first participant speaking;
    detecting, by the application, a first indicator of a first type of conversational irregularity in the first audio data;
    determining, by the application and based on the first indicator, that a triggering event has occurred; and
    causing, via the application, first interrupting content to be presented, wherein the first interrupting content:
        includes moderating guidance associated with the detected conversational irregularity, and
        is presented at a subsequent second time while one or both of the first participant and second participant are speaking.

10. The method of claim 9, wherein the first type of conversational irregularity is one of an instance in which the first participant cut off the second participant mid-speech, the first participant and second participant are speaking over one another, the first participant is raising their voice, and the first participant is repeating what the second participant said earlier in the conversation.

11. The method of claim 9, wherein the moderating guidance includes a suggestion that the second participant be allowed to continue speaking.

12. The method of claim 9, wherein the moderating guidance includes a recognition that the second participant previously raised an idea that is now being raised in first audio data.

13. The method of claim 9, further comprising:
    receiving, by the application and prior to the first time, a first input describing an agenda for the conversation; and
    wherein the moderating guidance includes a reminder that content in the first audio data is off-topic with respect to the agenda.

14. The method of claim 9, further comprising:
    receiving, by the application and prior to the first time, a first data input corresponding to a selection of a duration;
    storing the first data input in a preferences module for the first participant;
    determining, by the application, the first audio data includes substantially continuous speech made by the first participant that exceeds the selected duration; and
    causing, via the application, second interrupting content to be presented, wherein the second interrupting content includes a notification that the first user has exceeded the selected duration.

15. The method of claim 9, further comprising wherein the first interrupting content is presented as either audio output that interrupts the first participant while the first participant is speaking or visual output that interrupts the first participant while either the first participant or second participant is speaking.

16. A computer-implemented method of determining whether a speech irregularity has occurred, the method comprising:

receiving, at a first time and by an application accessed via a computing device, first audio data of a first user speaking;

classifying, via a speech-based machine learning model for the application, one or more speech characteristics associated with the first user based on the first audio data;

receiving, at a second time and by the application, second audio data of the first user speaking;

determining, via the application, that a speech irregularity has occurred in the second audio data, the determination based at least in part by a comparison of the second audio data with the classified speech characteristics; and causing, via the application, first interrupting content to be presented by the computing device in response to the determination that a speech irregularity has occurred, wherein the first interrupting content:

includes feedback about the detected speech irregularity, and is presented at a subsequent third time regardless of whether the first user is still speaking.

17. The method of claim 16, wherein the speech-based machine learning model resides on a first computer device associated with the first user.

18. The method of claim 16, further comprising generating, based on the speech characteristics, a user profile for the first user, the user profile including an identification of a language and an accent of the first user.

19. The method of claim 18, further comprising:

receiving from the first user, at a third time and by the application, a first selection of a first type of speech irregularity that should elicit presentation of interrupting content from the application;

storing, by the application, the first selection in the user profile; and referring to the user profile when determining whether a speech irregularity has occurred.

20. The method of claim 18, further comprising:

receiving from the first user, at a third time and by the application, a first selection of a first type of speech irregularity that should be excluded from triggering a presentation of interrupting content from the application;

storing, by the application, the first selection in the user profile; and referring to the user profile when determining whether a speech irregularity has occurred.

* * * * *